US011677435B2

(12) United States Patent
Abramov et al.

(10) Patent No.: US 11,677,435 B2
(45) Date of Patent: *Jun. 13, 2023

(54) WIDE BANDWIDTH DIGITAL PRE-DISTORTION (DPD) IN A REMOTE UNIT(S) FOR A WIRELESS COMMUNICATIONS SYSTEM (WCS)

(71) Applicant: Corning Research & Development Corporation, Corning, NY (US)

(72) Inventors: Yury Abramov, Rosh HaAin (IL); Roi Yosy Ziv, Ramat-Gan (IL)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,430

(22) Filed: Nov. 29, 2021

(65) Prior Publication Data

US 2022/0085844 A1    Mar. 17, 2022

Related U.S. Application Data

(63) Continuation of application No. 16/887,814, filed on May 29, 2020, now Pat. No. 11,190,230.

(51) Int. Cl.
  H04B 1/62 (2006.01)
  H04B 1/50 (2006.01)
  H04W 88/08 (2009.01)
  H04B 1/04 (2006.01)
(52) U.S. Cl.
  CPC ............... *H04B 1/62* (2013.01); *H04B 1/04* (2013.01); *H04B 1/50* (2013.01); *H04W 88/085* (2013.01); *H04B 2001/0425* (2013.01)

(58) Field of Classification Search
  CPC .......................................................... H04B 1/62
  USPC .......................................................... 375/296
  See application file for complete search history.

(56) References Cited

U.S. PATENT DOCUMENTS

| 5,400,391 A | 3/1995 | Emura et al. |
| 6,384,680 B1 | 5/2002 | Takei et al. |
| 6,496,546 B1 | 12/2002 | Allpress et al. |
| 8,149,950 B2 | 4/2012 | Kim et al. |

(Continued)

*Primary Examiner* — Lihong Yu
(74) *Attorney, Agent, or Firm* — William D. Doyle

(57) ABSTRACT

Wide bandwidth digital pre-distortion (DPD) in a remote unit(s) for a wireless communications system (WCS) is disclosed. In embodiments disclosed herein, a remote unit(s) includes at least two transceiver circuits, each configured to process (e.g., perform DPD) a respective downlink digital communications signal corresponding to a portion of the carrier bandwidth. Each of the transceiver circuits is further configured to convert the respective downlink digital communications signal into a respective downlink RF communications signal. The respective downlink RF communications signals generated by the transceiver circuits are subsequently combined to form a downlink RF communications signal(s) associated with the carrier bandwidth. By employing multiple transceiver circuits in the remote unit(s) to each handle a portion of the carrier bandwidth, it may be possible to mitigate processing bandwidth limitations of the remote unit(s), thus making it possible to satisfy the regulatory and/or operational requirements for supporting wide bandwidth communications in the WCS.

19 Claims, 19 Drawing Sheets

(56) References Cited

U.S. PATENT DOCUMENTS

| | | |
|---|---|---|
| 8,213,884 B2 | 7/2012 | Kim et al. |
| 8,224,266 B2 | 7/2012 | Liu et al. |
| 8,326,238 B2 | 12/2012 | Yang et al. |
| 8,351,877 B2 | 1/2013 | Kim et al. |
| 8,380,143 B2 | 2/2013 | Yang et al. |
| 8,467,747 B2 | 6/2013 | Kim et al. |
| 8,472,897 B1 | 6/2013 | Yang |
| 8,576,943 B2 | 11/2013 | Kilambi et al. |
| 8,693,962 B2 | 4/2014 | Liu et al. |
| 8,731,495 B2 | 5/2014 | Yang et al. |
| 8,873,674 B2 | 10/2014 | Kim et al. |
| 8,913,689 B2 | 12/2014 | Kim et al. |
| 9,225,296 B2 | 12/2015 | Kim |
| 11,190,230 B1 * | 11/2021 | Abramov .................. H04B 1/62 |
| 2004/0032912 A1 | 2/2004 | Ocenasek et al. |
| 2005/0162328 A1 | 7/2005 | Mori |
| 2012/0100813 A1 | 4/2012 | Mow et al. |
| 2013/0017863 A1 | 1/2013 | Kummetz et al. |
| 2013/0094612 A1 | 4/2013 | Kim et al. |
| 2014/0341144 A1 | 11/2014 | Zhang et al. |
| 2018/0220301 A1 | 8/2018 | Gallagher et al. |

\* cited by examiner

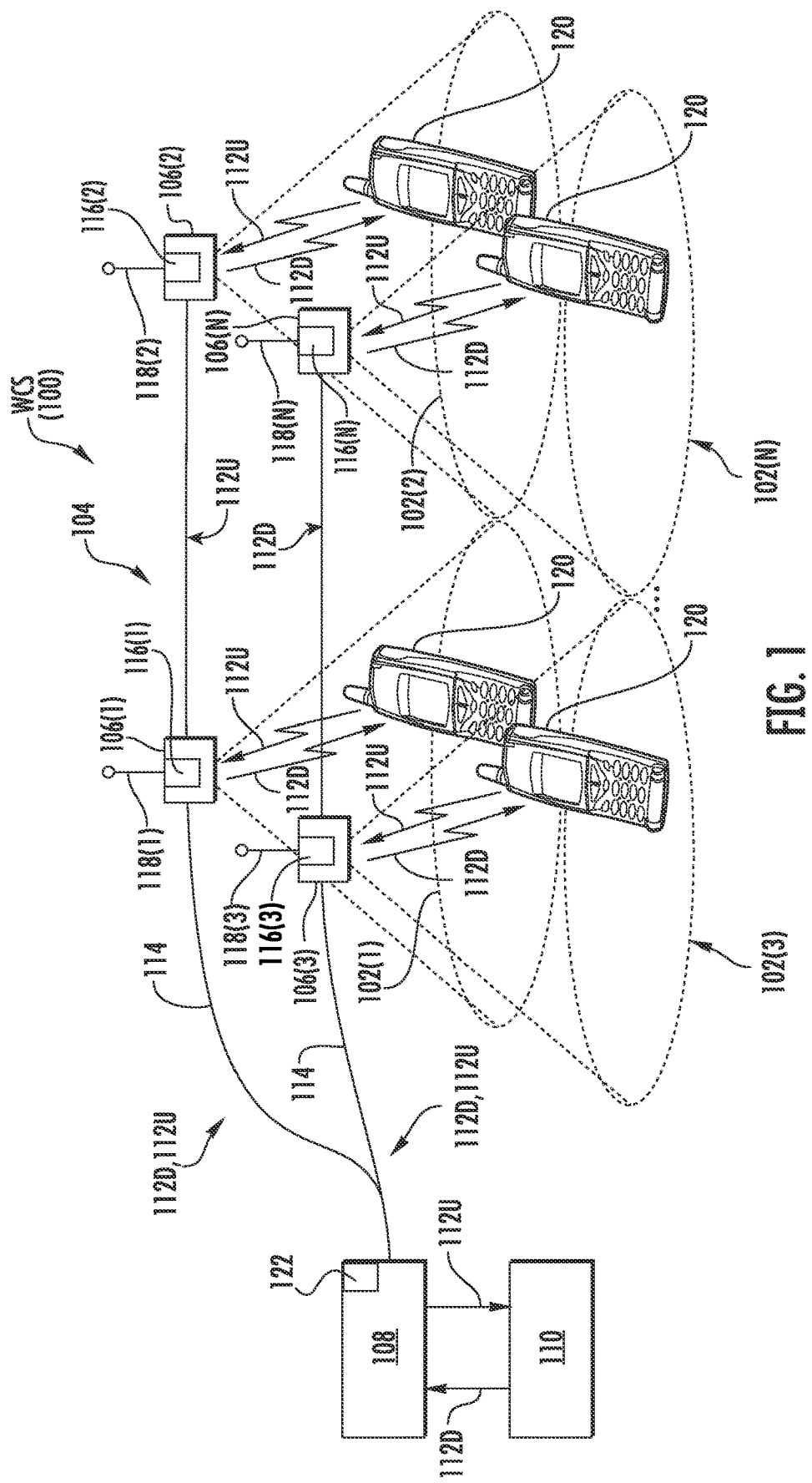

WIDE BANDWIDTH DIGITAL PRE-DISTORTION (DPD) IN A REMOTE UNIT(S) FOR A WIRELESS COMMUNICATIONS SYSTEM (WCS)

CROSS-REFERENCE TO RELATED APPLICATIONS

This application is a continuation of U.S. patent application Ser. No. 16/887,814, filed May 29, 2020, the content of which is relied upon and incorporated herein by reference in its entirety, and the benefit of priority under 35 U.S.C. § 120 is hereby claimed.

BACKGROUND

The disclosure relates generally to a remote unit(s) in a wireless communications system (WCS), such as a distributed communications system (DCS), configured to improve power amplifier (PA) efficiency and linearity via digital pre-distortion (DPD).

Wireless customers are increasingly demanding wireless communications services, such as cellular communications services and Wireless Fidelity (Wi-Fi) services. Thus, small cells, and more recently Wi-Fi services, are being deployed indoors. At the same time, some wireless customers use their wireless communications devices in areas that are poorly serviced by conventional cellular networks, such as inside certain buildings or areas where there is little cellular coverage. One response to the intersection of these two concerns has been the use of DCSs as WCSs, such as small cell radio access networks (RANs) or distributed antenna systems (DASs). DCSs include a central unit or node that is configured to transmit or distribute communications signals to remote units typically over physical mediums, such as electrical conductors or optical fiber. The remote units are configured to receive and distribute such communications signals to client devices within the antenna range of the remote unit. DCSs can be particularly useful when deployed inside buildings or other indoor environments where the wireless communications devices may not otherwise be able to effectively receive RF signals from a source.

In this regard, FIG. 1 illustrates a WCS 100, such as a DCS, that is configured to distribute communications services to remote coverage areas 102(1)-102(N), where 'N' is the number of remote coverage areas. The WCS 100 in FIG. 1 is provided in the form of a wireless DCS, such as a DAS 104. The DAS 104 can be configured to support a variety of communications services that can include cellular communications services, wireless communications services, such as RF identification (RFID) tracking, Wi-Fi, local area network (LAN), wireless LAN (WLAN), wireless solutions (Bluetooth, Wi-Fi Global Positioning System (GPS) signal-based, and others) for location-based services, and combinations thereof, as examples. The remote coverage areas 102(1)-102(N) are created by and centered on remote units 106(1)-106(N) connected to a central unit 108 (e.g., a head-end controller, a central unit, or a head-end unit). The central unit 108 may be communicatively coupled to a source transceiver 110, such as for example, a base transceiver station (BTS) or a baseband unit (BBU). In this regard, the central unit 108 receives downlink communications signals 112D from the source transceiver 110 to be distributed to the remote units 106(1)-106(N). The downlink communications signals 112D can include data communications signals and/or communication signaling signals, as examples. The central unit 108 is configured with filtering circuits and/or other signal processing circuits that are configured to support a specific number of communications services in a particular frequency bandwidth (i.e., frequency communications bands). The downlink communications signals 112D are communicated by the central unit 108 over a communications link 114 over their frequency to the remote units 106(1)-106(N).

With continuing reference to FIG. 1, the remote units 106(1)-106(N) are configured to receive the downlink communications signals 112D from the central unit 108 over the communications link 114. The downlink communications signals 112D are configured to be distributed to the respective remote coverage areas 102(1)-102(N) of the remote units 106(1)-106(N). The remote units 106(1)-106(N) are also configured with filters and other signal processing circuits that are configured to support all or a subset of the specific communications services (i.e., frequency communications bands) supported by the central unit 108. In a non-limiting example, the communications link 114 may be a wired communications link, a wireless communications link, or an optical fiber-based communications link. Each of the remote units 106(1)-106(N) may include an RF transmitter/receiver 116(1)-116(N) and a respective antenna 118(1)-118(N) operably connected to the RF transmitter/receiver 116(1)-116(N) to wirelessly distribute the communications services to user equipment (UE) 120 within the respective remote coverage areas 102(1)-102(N). The remote units 106(1)-106(N) are also configured to receive uplink communications signals 112U from the UE 120 in the respective remote coverage areas 102(1)-102(N) to be distributed to the source transceiver 110.

Because the remote units 106(1)-106(N) include components that require power to operate, such as the RF transmitters/receivers 116(1)-116(N) for example, it is necessary to provide power to the remote units 106(1)-106(N). In one example, each remote unit 106(1)-106(N) may receive power from a local power source. In another example, the remote units 106(1)-106(N) may be powered remotely from a remote power source(s). For example, the central unit 108 in the WCS 100 in FIG. 1 includes a power source 122 that is configured to remotely supply power over the communications links 114 to the remote units 106(1)-106(N). For example, the communications links 114 may be cable that includes electrical conductors for carrying current (e.g., direct current (DC)) to the remote units 106(1)-106(N). If the WCS 100 is an optical fiber-based DCS in which the communications links 114 include optical fibers, the communications links 114 may be a "hybrid" cable that includes optical fibers for carrying the downlink and uplink communications signals 112D, 112U and separate electrical conductors for carrying current to the remote units 106(1)-106(N).

The remote units 106(1)-106(N) in the DAS 104 are typically required to distribute the downlink communications signals 112D at a required power level (e.g., up to 80 watts) such that the downlink communications signals 112D can reach as many UEs 120 as possible in the remote coverage areas 102(1)-102(N). As such, each of the remote units 106(1)-106(N) may employ a PA(s) to amplify the downlink communications signals 112D to the required power level before transmitting the downlink communications signals 112D to the UE 120.

No admission is made that any reference cited herein constitutes prior art. Applicant expressly reserves the right to challenge the accuracy and pertinency of any cited documents.

SUMMARY

Embodiments disclosed herein include wide bandwidth digital predistortion (DPD) in a remote unit(s) for a wireless communications system (WCS). In examples discussed herein, a remote unit(s) includes a power amplifier(s) (PA(s)) configured to amplify a downlink radio frequency (RF) communications signal before transmission. Notably, the PA(s) may cause an unwanted distortion term(s), such as third-order intermodulation distortion (IMD3), in the amplified downlink RF communications signal. Consequently, the remote unit(s) may fail to satisfy such regulatory and/or operational requirements as adjacent channel power ratio (ACPR) and IMD3. To help reduce the unwanted distortion term(s) in the downlink RF communications signal, a DPD circuit(s) may be provided in the remote unit(s) to add an artificial distortion term(s), which has an opposite phase relative to the unwanted distortion term(s), into a corresponding downlink digital communications signal before converting the downlink digital communications signal into the downlink RF communications signal. Accordingly, the artificial distortion term(s) can cancel the unwanted distortion term(s) in the amplified downlink RF communications signal. In some WCSs, such as a WCS supporting fifth-generation new-radio (5G-NR), the downlink RF communications signal may be transmitted across a wide carrier bandwidth (e.g., 400 MHz). However, the DPD circuit(s) and/or the PA(s) in the remote unit may have limited processing bandwidth (also known as instantaneous bandwidth) compared to the carrier bandwidth. As a result, the DPD circuit(s) may not be able to effectively cancel all of the unwanted distortion term(s), thus causing the remote unit(s) to fail the regulatory and/or operational requirements. In this regard, the processing bandwidth of the DPD circuit(s) can become a bottleneck for supporting wide bandwidth communications in the WCS. Hence, it may be desired to perform a wide bandwidth DPD in the remote unit for the WCS.

In embodiments disclosed herein, a remote unit(s) includes at least two transceiver circuits, each configured to process (e.g., performing DPD) a respective downlink digital communications signal corresponding to a portion of the carrier bandwidth. For example, to support a 400 MHz carrier bandwidth, two transceiver circuits can be employed to each process the respective downlink digital communications signal of a 200 MHz bandwidth. Each of the transceiver circuits is further configured to convert the respective downlink digital communications signal into a respective downlink RF communications signal. The respective downlink RF communications signals generated by the transceiver circuits are subsequently combined to form a downlink RF communications signal(s) associated with the carrier bandwidth. By employing multiple transceiver circuits in the remote unit(s) to each handle a portion of the carrier bandwidth, it may be possible to mitigate processing bandwidth limitations of the remote unit(s), thus making it possible to satisfy the regulatory and/or operational requirements for supporting wide bandwidth communications in the WCS.

One exemplary embodiment of the disclosure relates to a WCS. The WCS includes a plurality of remote units. At least one remote unit among the plurality of remote units includes a first transceiver circuit. The first transceiver circuit is configured to receive a first downlink digital communications signal corresponding to a first signal bandwidth. The first transceiver circuit is also configured to convert the first downlink digital communications signal into a first downlink RF communications signal corresponding to a first processing bandwidth that is at least three times the first signal bandwidth. The at least one remote unit also includes a second transceiver circuit. The second transceiver circuit is configured to receive a second downlink digital communications signal corresponding to a second signal bandwidth. The second transceiver circuit is also configured to convert the second downlink digital communications signal into a second downlink RF communications signal corresponding to a second processing bandwidth that is at least three times the second signal bandwidth. The at least one remote unit also includes a combining circuit coupled to the first transceiver circuit and the second transceiver circuit. The combining circuit is configured to output at least one downlink RF communications signal comprising the first downlink RF communications signal and the second downlink RF communications signal and corresponding to a carrier bandwidth greater than or equal to a sum of the first signal bandwidth and the second signal bandwidth.

An additional exemplary embodiment of the disclosure relates to a method for supporting wide bandwidth DPD in a remote unit for a WCS. The method includes, in a first transceiver circuit, receiving a first downlink digital communications signal corresponding to a first signal bandwidth. The method also includes, in the first transceiver circuit, converting the first downlink digital communications signal into a first downlink RF communications signal corresponding to a first processing bandwidth that is at least three times the first signal bandwidth. The method also includes, in a second transceiver circuit, receiving a second downlink digital communications signal corresponding to a second signal bandwidth. The method also includes, in the second transceiver circuit, converting the second downlink digital communications signal into a second downlink RF communications signal corresponding to a second processing bandwidth that is at least three times the second signal bandwidth. The method also includes outputting, via a combining circuit, at least one downlink RF communications signal comprising the first downlink RF communications signal and the second downlink RF communications signal and corresponding to a carrier bandwidth greater than or equal to a sum of the first signal bandwidth and the second signal bandwidth.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1 is a schematic diagram of an exemplary wireless communications system (WCS), such as a distributed communications system (DCS), configured to distribute communications services to remote coverage areas;

DETAILED DESCRIPTION

Figure 2A:
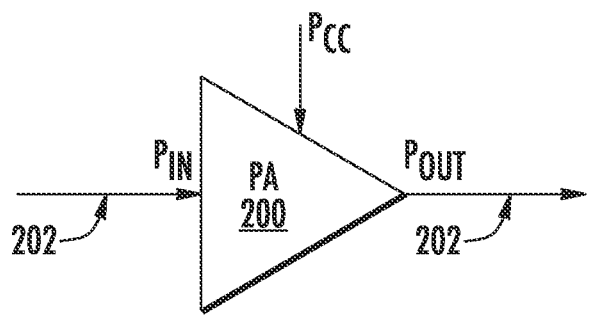
FIG. 2A is a schematic diagram of an exemplary power amplifier (PA) configured to amplify a radio frequency (RF) signal from an input power to an output power based on a direct current (DC) supply power.

Embodiments disclosed herein include wide bandwidth digital predistortion (DPD) in a remote unit(s) for a wireless communications system (WCS). In examples discussed herein, a remote unit(s) includes a power amplifier(s) (PA(s)) configured to amplify a downlink radio frequency (RF) communications signal before transmission. Notably, the PA(s) may cause an unwanted distortion term(s), such as third-order intermodulation distortion (IMD3), in the amplified downlink RF communications signal. Consequently, the remote unit(s) may fail to satisfy such regulatory and/or operational requirements as adjacent channel power ratio (ACPR) and IMD3. To help reduce the unwanted distortion term(s) in the downlink RF communications signal, a DPD circuit(s) may be provided in the remote unit(s) to add an artificial distortion term(s), which has an opposite phase relative to the unwanted distortion term(s), into a corresponding downlink digital communications signal before converting the downlink digital communications signal into the downlink RF communications signal. Accordingly, the artificial distortion term(s) can cancel the unwanted distortion term(s) in the amplified downlink RF communications signal. In some WCSs, such as a WCS supporting fifth-generation new-radio (5G-NR), the downlink RF communications signal may be transmitted across a wide carrier bandwidth (e.g., 400 MHz). However, the DPD circuit(s) and/or the PA(s) in the remote unit may have limited processing bandwidth (also known as instantaneous bandwidth) compared to the carrier bandwidth. As a result, the DPD circuit(s) may not be able to effectively cancel all of the unwanted distortion term(s), thus causing the remote unit(s) to fail the regulatory and/or operational requirements. In this regard, the processing bandwidth of the DPD circuit(s) can become a bottleneck for supporting wide bandwidth communications in the WCS. Hence, it may be desired to perform a wide bandwidth DPD in the remote unit for the WCS.

In embodiments disclosed herein, a remote unit(s) includes at least two transceiver circuits, each configured to process (e.g., perform DPD) a respective downlink digital communications signal corresponding to a portion of the carrier bandwidth. For example, to support a 400 MHz carrier bandwidth, two transceiver circuits can be employed to each process the respective downlink digital communications signal of a 200 MHz bandwidth. Each of the transceiver circuits is further configured to convert the respective downlink digital communications signal into a respective downlink RF communications signal. The respective downlink RF communications signals generated by the transceiver circuits are subsequently combined to form a downlink RF communications signal(s) associated with the carrier bandwidth. By employing multiple transceiver circuits in the remote unit(s) to each handle a portion of the carrier bandwidth, it may be possible to mitigate processing bandwidth limitations of the remote unit(s), thus making it possible to satisfy the regulatory and/or operational requirements for supporting wide bandwidth communications in the WCS.

Figure 2B:
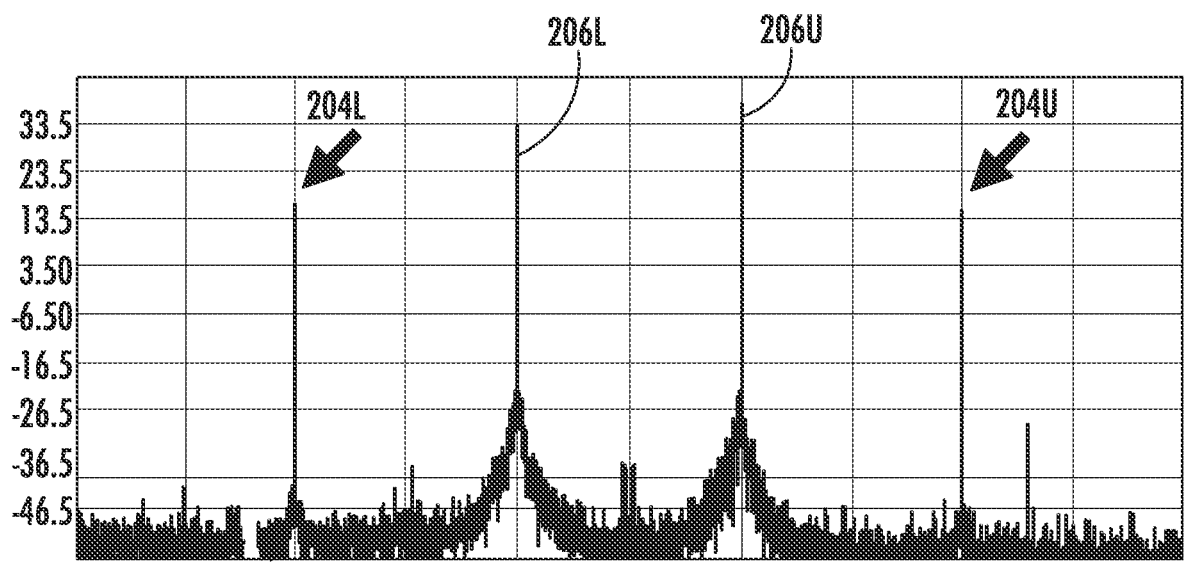
FIG. 2B is a graphic diagram providing an exemplary illustration of a pair of third-order intermodulation distortions (IMD3s) that the PA of FIG. 2A may create when amplifying the RF signal from the input power to the output power.
Figure 2C:
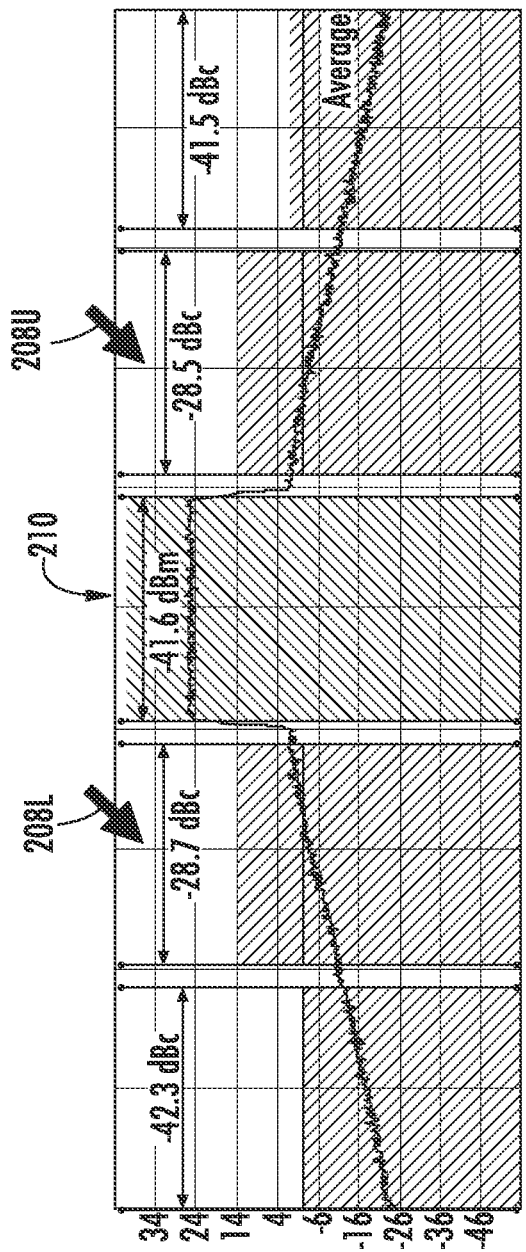
FIG. 2C is a graphic diagram providing an exemplary illustration of an adjacent channel power ratio (ACPR) measurement in a pair of adjacent channels and outside a wanted channel in which the RF signal of FIG. 2A is modulated.
Figure 2D:
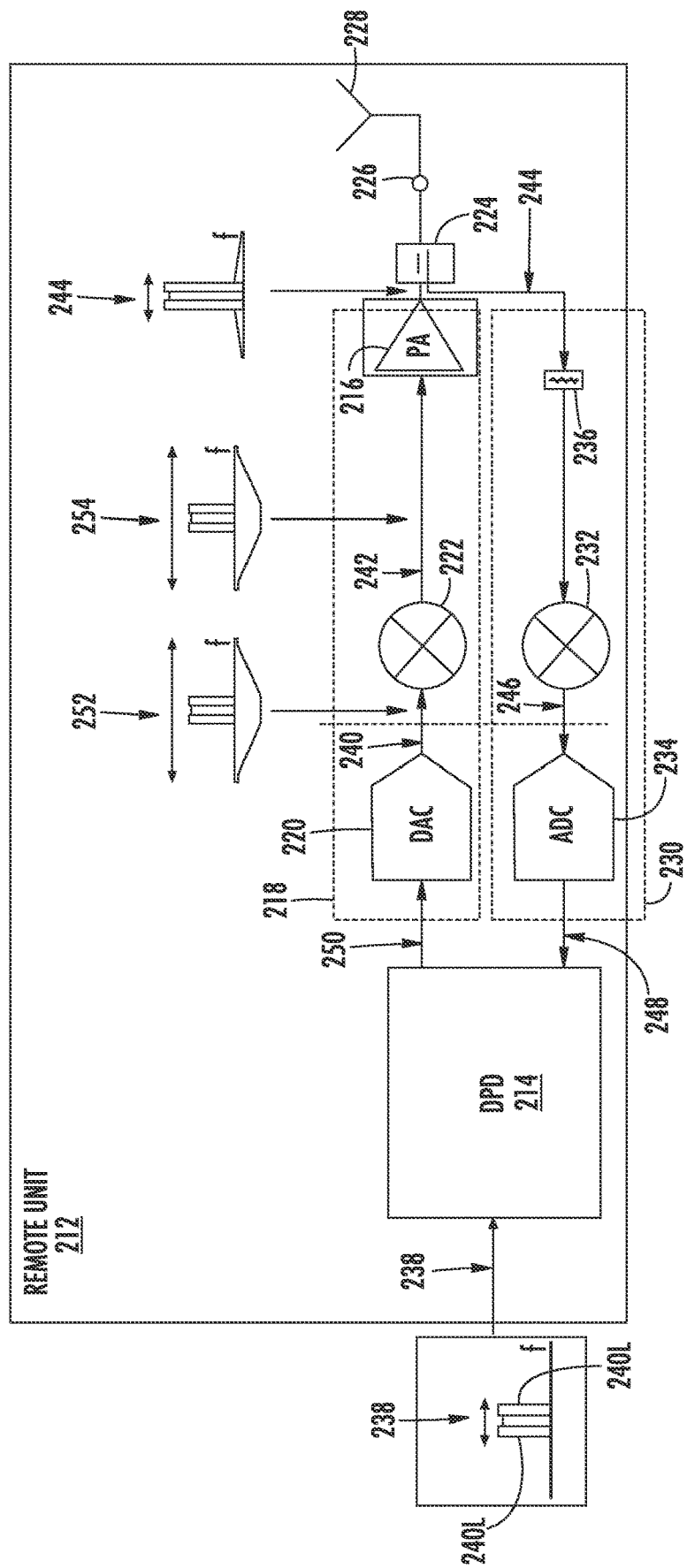
FIG. 2D is a schematic diagram of an exemplary existing remote unit including a digital pre-distortion (DPD) circuit configured to improve linearity performance (e.g., IMD3 and ACPR) of a PA.
Figure 3:
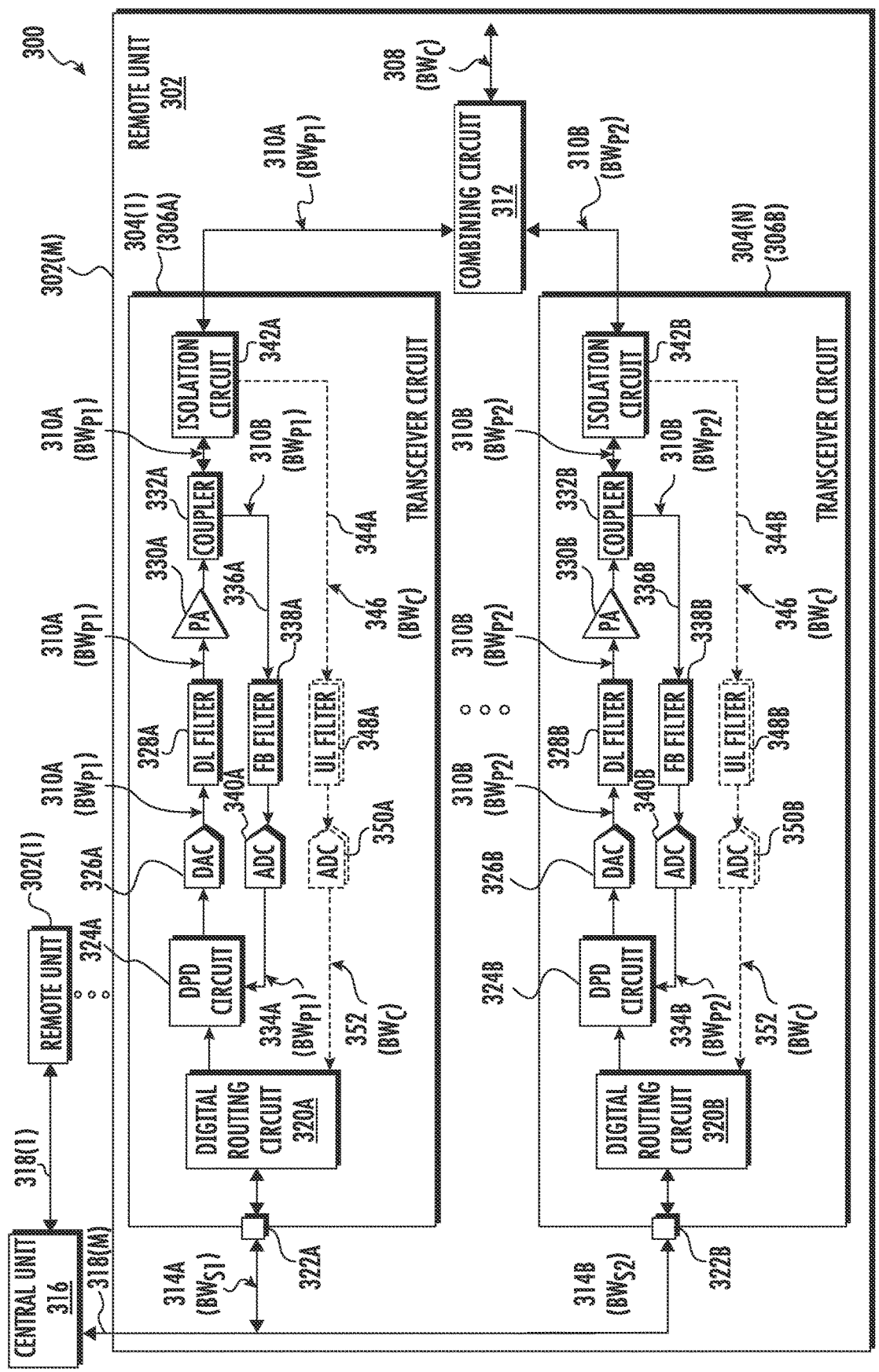
FIG. 3 is a schematic diagram of an exemplary WCS in which a remote unit(s) is configured to support wide bandwidth DPD in a wide bandwidth time-division duplex (TDD) band.

Before discussing a remote unit(s) in a WCS that supports wide bandwidth DPD of the present disclosure, starting at FIG. 3, a brief overview of a PA is first provided with reference to FIGS. 2A-2D to help understand key performance metrics of a PA and how DPD can improve the key performance metrics of the PA.

FIG. 2A is a schematic diagram of an exemplary PA 200 configured to amplify an RF signal 202 from an input power $P_{IN}$ to an output power $P_{OUT}$ based on a direct current (DC) supply power $P_{CC}$. Notably, the most important figure of merit for the PA 200 includes PA efficiency and PA linearity.

The PA efficiency, which is a measure of the DC supply power $P_{CC}$ required by the PA 200 to amplify the RF signal 202 to the output power $P_{OUT}$, can be determined based on equation (Eq. 1) below.

$$PA \text{ Efficiency } (\%) = 100 * P_{OUT} / P_{CC} \qquad (Eq. 1)$$

The PA linearity is a measure of unwanted distortion terms being added to the RF signal 202 when the PA 200 amplifies the RF signal 202 from the input power $P_{IN}$ to the output power $P_{OUT}$. The PA linearity may be measured based on a set of metrics, namely IMD3, ACPR, and output power saturation point (OPsat).

When the RF signal 202 is a two-tone signal, which includes two RF signals located at two adjacent frequency bands/channels (e.g., 1962.5 MHz with 2 MHz channel spacing), the PA 200 may create the IMD3 outside the adjacent frequency bands/channels of the two-tone signal. In this regard, FIG. 2B is a graphic diagram providing an exemplary illustration of a pair of IMD3s 204L and 204U that the PA 200 of FIG. 2A may create when amplifying the RF signal 202 from the input power $P_{IN}$ to the output power $P_{OUT}$.

The RF signal 202 can correspond to a lower tone 206L and an upper tone 206U. The PA 200 creates the IMD3s 204L and 204U outside the lower tone 206L and the upper tone 206U, respectively. In a non-limiting example, the RF signal 202 may have a peak signal amplitude of 38.676 dBm, while the IMD3s 204L and 204U can have a peak IMD3 amplitude of 16.235 dBm.

The ACPR is designed to measure PA linearity when the RF signal 202 is a modulated signal. Specifically, the ACPR measures the unwanted distortion terms that the PA 200 creates in adjacent channels outside a wanted channel in which the RF signal 202 is modulated. In this regard, FIG. 2C is a graphic diagram providing an exemplary illustration of ACPR measurements in a pair of adjacent channels 208L and 208U outside of a wanted channel 210 in which the RF signal 202 of FIG. 2A is modulated. In a non-limiting example, the RF signal 202 in the wanted channel 210 can have a peak power of 41.6 dBm, while the ACPR in the adjacent channels 208L and 208U can be as high as 13.17 dBm.

The OPsat reflects a maximum of the output power $P_{OUT}$ the PA 200 can achieve. When the PA 200 operates above the OPsat, the output power $P_{OUT}$ does not increase in proportion to an increase of the input power $P_{IN}$. In this regard, the PA 200 is saturated and can suffer a decreased PA gain as a result.

When the PA 200 is provided in a small form factor device (e.g., a smartphone), it may be desired for the PA 200 to have a higher efficiency to help reduce power consumption in the small form factor device. In contrast, in a higher power device (e.g., a remote unit), the PA 200 may be further required to exhibit higher linearity such that the higher power device can satisfy stringent regulatory and/or industrial requirements, such as IMD3 and ACPR, in addition to conserving power. However, a higher PA efficiency is often achieved at an expense of PA linearity, and vice versa. As such, it may be desired to configure the PA 200 to operate with higher PA efficiency, while improving PA linearity by means of DPD.

In this regard, FIG. 2D is a schematic diagram of an exemplary existing remote unit 212 including a DPD circuit 214 configured to improve linearity performance (e.g., IMD3 and ACPR) of a PA 216. The DPD circuit 214 is coupled to a signal path 218. The signal path 218 includes a digital-to-analog converter (DAC) 220 coupled to the DPD circuit 214, a downlink signal frequency conversion circuit 222 (e.g., a frequency up-conversion circuit) coupled to the DAC 220, and the PA 216. The PA 216 is coupled between the downlink signal frequency conversion circuit 222 and a coupler 224. The coupler 224 is coupled to an antenna port 226 configured to connect to an antenna 228.

The existing remote unit 212 also includes a feedback path 230. The feedback path 230 includes a feedback signal frequency conversion circuit 232 (e.g., a frequency down-conversion circuit) coupled to the coupler 224 and an analog-to-digital converter (ADC) 234 coupled between the feedback signal frequency conversion circuit 232 and the DPD circuit 214. The feedback path 230 may include an attenuator 236 coupled between the coupler 224 and the feedback signal frequency conversion circuit 232.

The existing remote unit 212 receives a digital input signal 238 that includes a lower tone 240L and an upper tone 240U. If the DPD circuit 214 and the feedback path 230 are not provided in the existing remote unit 212, the DAC 220 will receive and convert the digital input signal 238 into an intermediate frequency (IF) signal 240, the downlink signal frequency conversion circuit 222 will receive and convert the IF signal 240 into an RF signal 242, and the PA 216 will receive and amplify the RF signal 242 to generate an amplified RF signal 244. As previously discussed in FIGS. 2A-2C, the PA 216 may be inherently nonlinear. As a result, the PA 216 may create at least one unwanted distortion term, such as the IMD3 204L and 204U in FIG. 2B in the amplified RF signal 244, which can cause a worsened ACPR in channels adjacent to the lower tone 240L and/or the upper tone 240U, such as the adjacent channels 208L and 208U in FIG. 2C.

In contrast, with the DPD circuit 214 and the feedback path 230, the feedback signal frequency conversion circuit 232 receives a replica of the amplified RF signal 244 that includes the unwanted distortion term via the coupler 224. If the attenuator 236 is also provided in the feedback path 230, the attenuator 236 may be configured to attenuate the replica of the amplified RF signal 244. The feedback signal frequency conversion circuit 232 converts the replica of the amplified RF signal 244 into an IF feedback signal 246. The ADC 234 receives and converts the IF feedback signal 246 into a digital feedback signal 248, which understandably includes a digital representation of the unwanted distortion term.

The DPD circuit 214 receives the digital input signal 238 and the digital feedback signal 248. The DPD circuit 214 may be configured to analyze the digital representation of the unwanted distortion term received in the digital feedback signal 248 to obtain such information as phase and amplitude of the unwanted distortion term. Accordingly, the DPD circuit 214 may digitally process the digital input signal 238 to generate a pre-distorted digital signal 250. More specifically, based on the information the DPD circuit 214 has obtained about the unwanted distortion term via the digital feedback signal 248, the DPD circuit 214 may then add an artificial distortion term, which has a substantially similar amplitude and a substantially opposing phase relative to the amplitude and phase of the unwanted distortion term, into the pre-distorted digital signal 250. The DAC 220 receives and converts the pre-distorted digital signal 250 into a pre-distorted IF signal 252, which understandably includes the artificial distortion term. The downlink signal frequency conversion circuit 222 receives and converts the pre-distorted IF signal 252 into a pre-distorted RF signal 254, which understandably includes the artificial distortion term. The PA 216 receives and amplifies the pre-distorted RF signal 254 to generate the amplified RF signal 244. Given that the pre-distorted RF signal 254 includes the artificial distortion term having the substantially similar amplitude and the substantially opposing phase relative to the unwanted distortion term the PA 216 would create during amplification of the pre-distorted digital signal 250, the unwanted distortion term may be sufficiently canceled out in the amplified RF signal 244.

Notably, for the DPD circuit 214 to effectively suppress the unwanted distortion term in the amplified RF signal 244, the DPD circuit 214 needs to have a higher processing bandwidth (also referred to as "instantaneous bandwidth") than a carrier bandwidth occupied by the amplified RF signal 244. For example, if the amplified RF signal 244 is transmitted in Time-Division Duplex (TDD) Citizen Broadband Radio Service (CBRS) C-block (3550-3950 MHz), the carrier bandwidth occupied by the amplified RF signal 244 will be 400 MHz. In this regard, the processing bandwidth of the DPD circuit 214 needs to be significantly higher than 400 MHz. However, it may be difficult for the DPD circuit 214 to provide the required processing bandwidth at a reasonable cost and/or size. As a result, the DPD circuit 214 may not be able to sufficiently suppress the unwanted distortion term in the amplified RF signal 244, thus making it difficult for the existing remote unit 212 to meet the IMD3 and/or ACPR requirements. Hence, it may be desired to improve the existing remote unit 212 to support wide bandwidth DPD for improved RF performance.

In this regard, FIG. 3 is a schematic diagram of an exemplary WCS 300 in which at least one remote unit 302 is configured to support wide bandwidth DPD for improved RF performance of the WCS 300 in a TDD carrier band. The WCS 300 includes a plurality of remote units 302(1)-302(M) and the remote unit 302 can be any one or more of the remote units 302(1)-302(M). The remote unit 302 can be configured to include two or more transceiver circuits 304(1)-304(N), wherein N≥2. For the convenience of reference, the transceiver circuit 304(1) and 304(N) are hereinafter referred to as "first transceiver circuit 306A" and "second transceiver circuit 306B," respectively. The remote unit 302 is configured to transmit at least one downlink RF communications signal 308 in the carrier band or channel occupying a carrier bandwidth $BW_C$. In a non-limiting example, the carrier band can be the TDD CBRS C-block band (3550-3950 MHz) with the carrier bandwidth $BW_C$ of 400 MHz.

As discussed in detail below, the first transceiver circuit 306A and the second transceiver circuit 306B are each configured to perform DPD for a portion of the carrier bandwidth $BW_C$. In a non-limiting example, if the carrier bandwidth $BW_C$ is 400 MHz, then each of the first transceiver circuit 306A and the second transceiver circuit 306B can perform DPD for one-half of the carrier bandwidth $BW_C$. In this regard, the first transceiver circuit 306A and the second transceiver circuit 306B will generate a first downlink RF communications signal 310A and a second downlink RF communications signal 310B, respectively. Each of the first downlink RF communications signal 310A and the second downlink RF communications signal 310B corresponds to one-half of the carrier bandwidth $BW_C$. The remote unit 302 also includes a combining circuit 312. The combining circuit 312 is configured to combine the first downlink RF communications signal 310A and the second downlink RF communications signal 310B to generate the downlink RF communications signal 308 that occupies the carrier bandwidth $BW_C$. Thus, by employing the first transceiver circuit 306A and the second transceiver circuit 306B in the remote unit 302 to each handle a portion of the carrier bandwidth $BW_C$, it may be possible to mitigate DPD processing bandwidth limitations in the remote unit 302, thus making it possible to satisfy the regulatory and/or operational requirements for supporting wide bandwidth communications in a WCS.

Although the remote unit 302 is shown in FIG. 3A to include the first transceiver circuit 306A and the second transceiver circuit 306B, it should be appreciated that more transceiver circuits can be added in the remote unit 302 to help further reduce DPD processing bandwidth requirements for each transceiver circuit. It should also be appreciated that it is not necessary to divide the carrier bandwidth $BW_C$ equally between the first transceiver circuit 306A and the second transceiver circuit 306B. For example, the first transceiver circuit 306A can be configured to perform DPD for one-third of the carrier bandwidth $BW_C$, and the second transceiver circuit 306B can be configured to perform DPD for two-thirds of the carrier bandwidth $BW_C$. In this regard, the remote unit 302 can employ transceiver circuits with different DPD processing bandwidth limits to support the wide bandwidth DPD in the WCS 300.

The first transceiver circuit 306A is configured to receive a first downlink digital communications signal 314A corresponding to a first signal bandwidth $BW_{S1}$, which is a portion of the carrier bandwidth $BW_C$. The second transceiver circuit 306B is configured to receive a second downlink digital communications signal 314B corresponding to a second signal bandwidth $BW_{S2}$, which is also a portion of the carrier bandwidth $BW_C$. The relationship between the first signal bandwidth $BW_{S1}$, the second signal bandwidth $BW_{S2}$, and the carrier bandwidth $BW_C$ can be further illustrated with reference to FIGS. 4A-4C. Common elements between FIGS. 3 and 4A-4C are shown therein with common element numbers and will not be re-described herein.

Figure 4A:
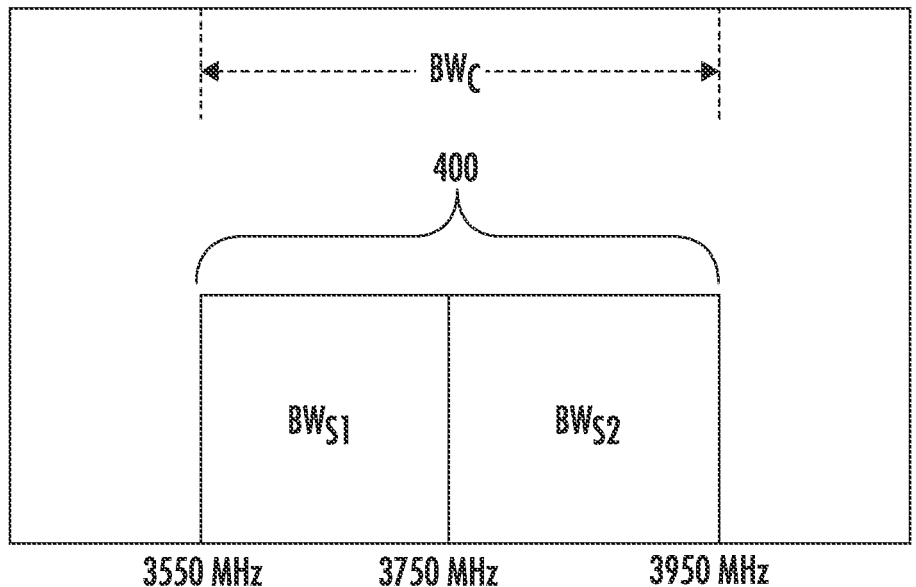
FIG. 4A is schematic diagram providing an exemplary illustration of a carrier bandwidth occupied by a single carrier channel.

FIG. 4A is schematic diagram providing an exemplary illustration of the carrier bandwidth $BW_C$ occupied by a single carrier channel 400. In a non-limiting example, the carrier bandwidth $BW_C$ is continuous bandwidth ranging from 3550 MHz to 3950 MHz. As such, the carrier bandwidth $BW_C$ can be so divided to have the first signal bandwidth $BW_{S1}$ ranging from 3550 MHz to 3750 MHz and the second signal bandwidth $BW_{S2}$ ranging from 3750 MHz to 3950 MHz. Given that there is no guard bandwidth in between the first signal bandwidth $BW_{S1}$ and the second signal bandwidth $BW_{S2}$, the carrier bandwidth $BW_C$ equals a sum of the first signal bandwidth $BW_{S1}$ and the second signal bandwidth $BW_{S2}$ ($BW_C=BW_{S1}+BW_{S2}$).

Figure 4B:
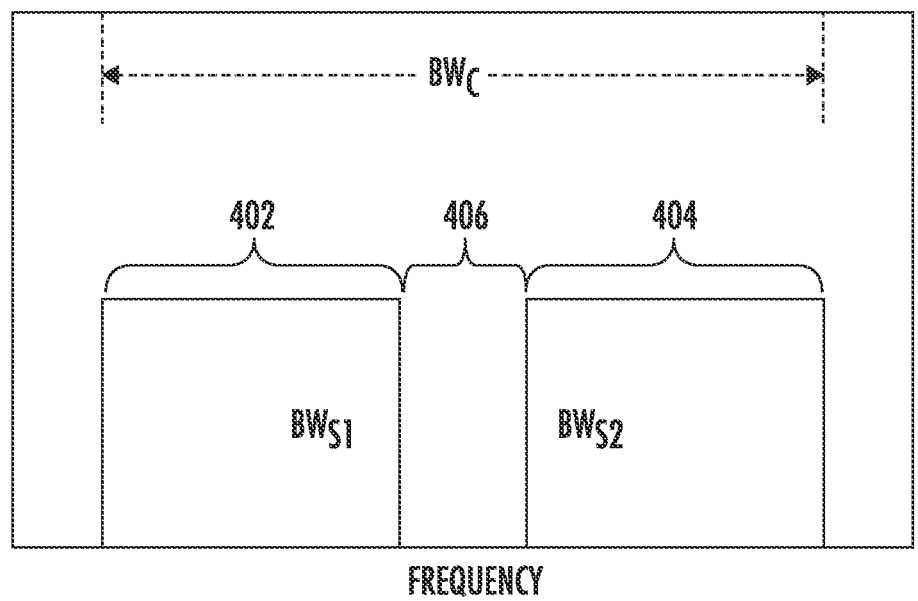
FIG. 4B is schematic diagram providing an exemplary illustration of a carrier bandwidth occupied by multiple carrier channels.

In contrast, FIG. 4B is schematic diagram providing an exemplary illustration of the carrier bandwidth $BW_C$ occupied by a first carrier channel 402 corresponding to the first signal bandwidth $BW_{S1}$ and a second carrier channel 404 corresponding to the second signal bandwidth $BW_{S2}$. The first carrier channel 402 is separated from the second carrier channel 404 by a guard band 406. As such, the carrier bandwidth $BW_C$ is greater than a sum of the first signal bandwidth $BW_{S1}$ and the second signal bandwidth $BW_{S2}$ ($BW_C>BW_{S1}+BW_{S2}$).

Figure 4C:
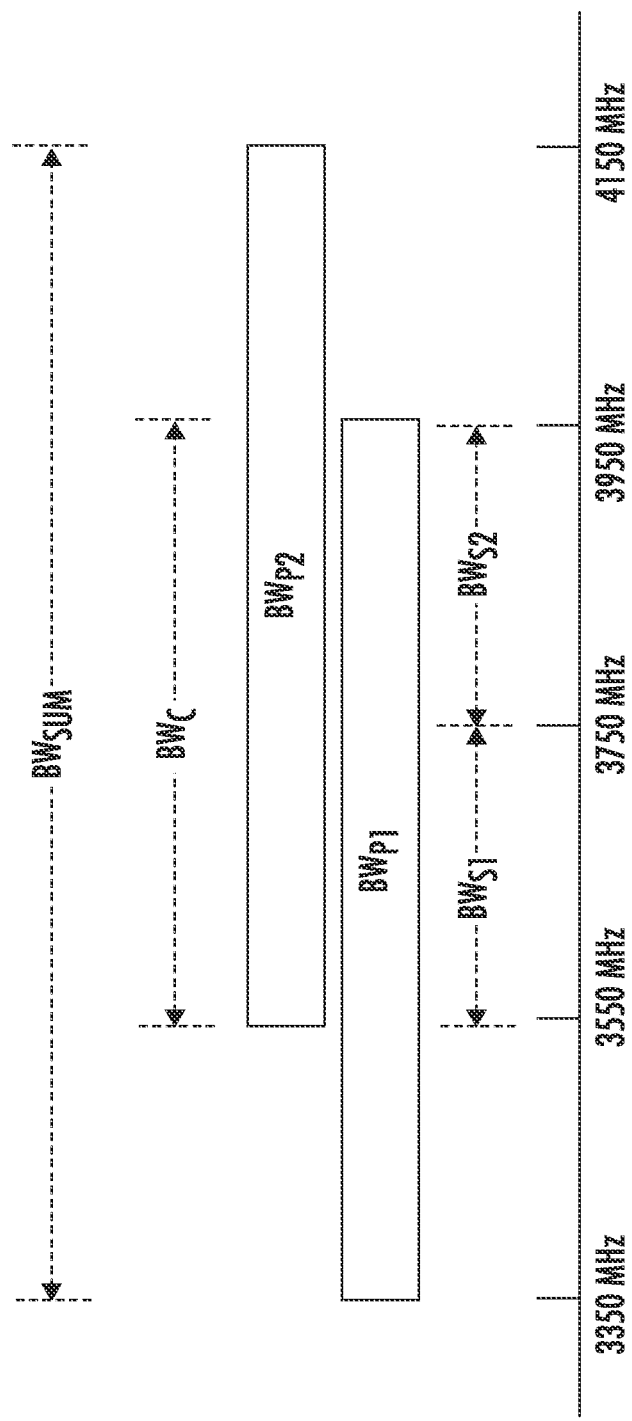
FIG. 4C is schematic diagram providing an exemplary illustration of a relationship between a signal bandwidth, a processing bandwidth, and a carrier bandwidth.

FIG. 4C is a schematic diagram providing an exemplary illustration of a relationship between the first signal bandwidth $BW_{S1}$, a first processing bandwidth $BW_{P1}$, the second signal bandwidth $BW_{S2}$, a second processing bandwidth $BW_{P2}$, and the carrier bandwidth $BW_C$. Notably, the example illustrated in FIG. 4C is based on the TDD CBRS C-block band (3550-3950 MHz). It should be appreciated that the same bandwidth relationship as illustrated herein can apply to any other frequency bands as well.

In a non-limiting example, the first signal bandwidth $BW_{S1}$ is 200 MHz (3550 MHz to 3750 MHz) and the first processing bandwidth $BW_{P1}$ is 600 MHz (3350 MHz to 3950 MHz). Similarly, the second signal bandwidth $BW_{S2}$ is 200 MHz (3750 MHz to 3950 MHz) and the second processing bandwidth $BW_{P2}$ is 600 MHz (3550 MHz to 4150 MHz). The carrier bandwidth $BW_C$ is 400 MHz (3550 MHz to 3950 MHz) for the TDD CBRS C-block band.

As illustrated in FIG. 4C, the first processing bandwidth $BW_{P1}$ overlaps with the second processing bandwidth $BW_{P2}$ between 3550 MHz and 3950 MHz, which is the same as the carrier bandwidth $BW_C$. In this regard, the carrier bandwidth $BW_C$ is narrower than a combined bandwidth $BW_{SUM}$ of the first processing bandwidth $BW_{P1}$ and the second processing bandwidth $BW_{P2}$. With the excessive processing bandwidth, the remote unit 302 can effectively suppress IMDs outside the carrier bandwidth $BW_C$.

With reference back to FIG. 3, the first transceiver circuit 306A is also configured to convert the first downlink digital communications signal 314A into the first downlink RF communications signal 310A. The first downlink RF communications signal 310A corresponds to the first processing bandwidth $BW_{P1}$ that is at least three times (e.g., five times) the first signal bandwidth $BW_{S1}$. The second transceiver circuit 306B is also configured to convert the second downlink digital communications signal 314B into the second downlink RF communications signal 310B. The second downlink RF communications signal 310B corresponds to the second processing bandwidth $BW_{P2}$ that is at least three times (e.g., five times) the first signal bandwidth $BW_{S1}$.

As further discussed below, the first transceiver circuit 306A and the second transceiver circuit 306B are configured to perform DPD based on the first processing bandwidth $BW_{P1}$ and the second processing bandwidth $BW_{P2}$, respectively. Given that each of the first signal bandwidth $BW_{S1}$ and the second signal bandwidth $BW_{S2}$ is only a portion (e.g., one-half) of the carrier bandwidth $BW_C$, as shown in FIG. 4C, the first processing bandwidth $BW_{P1}$ and the second processing bandwidth $BW_{P2}$ are reduced accordingly, compared to the processing bandwidth required for performing DPD based on the carrier bandwidth $BW_C$. As a result, it is possible to ease the processing bandwidth burden on the first transceiver circuit 306A and the second transceiver circuit 306B, thus making it possible to support wide bandwidth DPD in the remote unit 302 for improving RF performance of the remote unit 302 and the WCS 300 as a whole.

Figure 5:
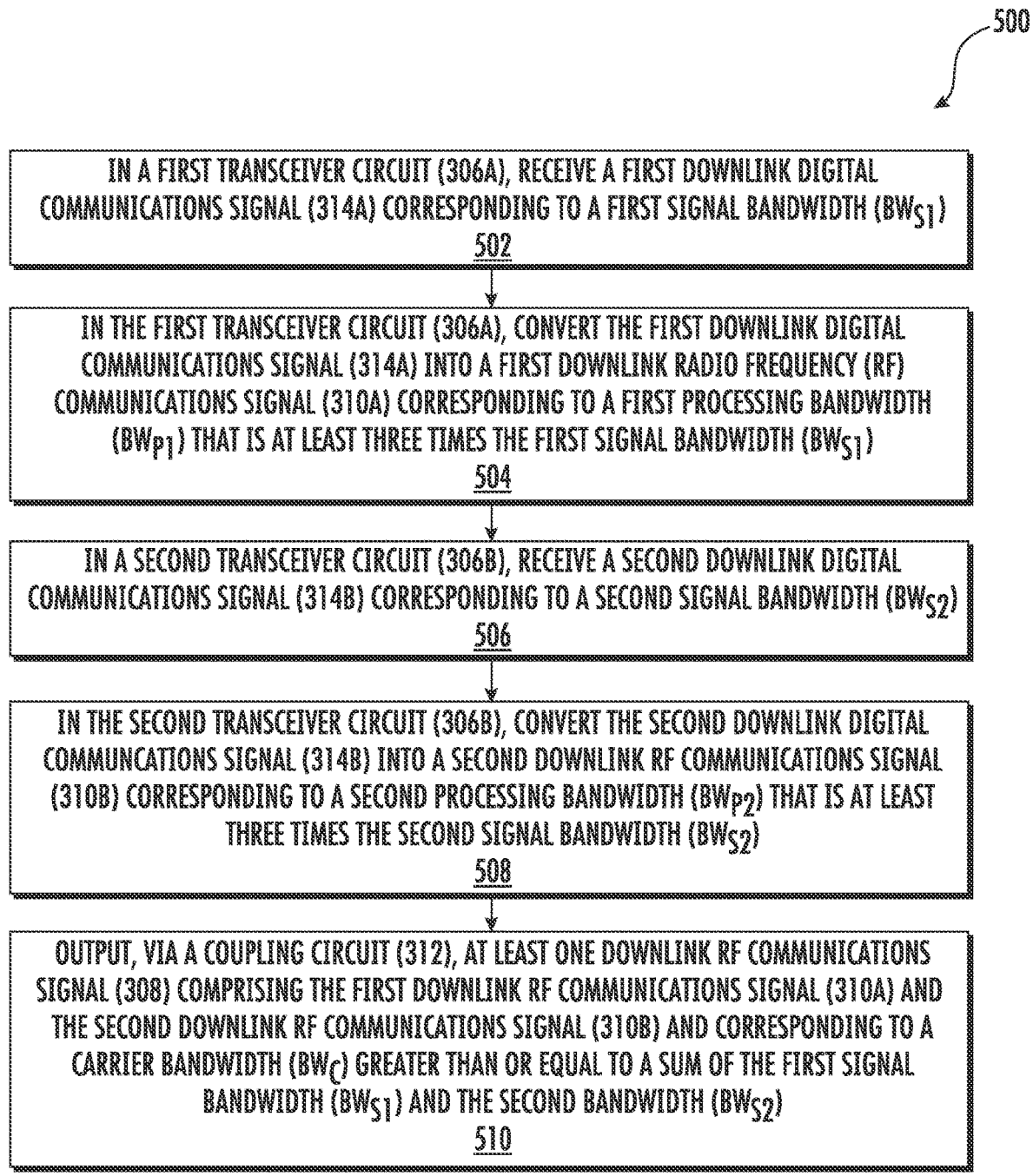
FIG. 5 is a flowchart of an exemplary process that can be employed by the remote unit(s) of FIG. 3 to support wide bandwidth.

The remote unit 302 can be configured to support wide bandwidth DPD based on a process. In this regard, FIG. 5 is a flowchart of an exemplary process 500 that can be employed by the remote unit 302 to support wide bandwidth DPD in the WCS 300 of FIG. 3.

According to the process 500, the first transceiver circuit 306A receives the first downlink digital communications signal 314A corresponding to the first signal bandwidth $BW_{S1}$ (block 502). The first transceiver circuit 306A converts the first downlink digital communications signal 314A into the first downlink RF communications signal 310A corresponding to the first processing bandwidth $BW_{P1}$ that is at least three times the first signal bandwidth $BW_{S1}$ (block 504). The second transceiver circuit 306B receives the second downlink digital communications signal 314B corresponding to the second signal bandwidth $BW_{S2}$ (block 506). The second transceiver circuit 306B converts the second downlink digital communications signal 314B into the second downlink RF communications signal 310B corresponding to the second processing bandwidth $BW_{P2}$ that is at least three times the second signal bandwidth $BW_{S2}$ (block 508). The combining circuit 312 is configured to output the downlink RF communications signal 308, which includes the first downlink RF communications signal 310A and the second downlink RF communications signal 310B and corresponds to the carrier bandwidth $BW_C$ that is greater than or equal to the sum of the first signal bandwidth $BW_{S1}$ and the second signal bandwidth $BW_{S2}$ (block 510).

With reference back to FIG. 3, the combining circuit 312 is coupled to the first transceiver circuit 306A and the second transceiver circuit 306B. Specifically, the combining circuit 312 is configured to output the downlink RF communications signal 308 that includes the first downlink RF communications signal 310A and the second downlink RF communications signal 310B. The downlink RF communications signal 308 corresponds to the carrier bandwidth $BW_C$, which can be greater than or equal to the sum of the first signal bandwidth $BW_{S1}$ and the second signal bandwidth $BW_{S2}$, as illustrated above in FIGS. 4A and 4B. Notably, the first transceiver circuit 306A and the second transceiver circuit 306B need to operate synchronously such that the combining circuit 312 can properly construct the downlink RF communications signal 308 based on the first downlink RF communications signal 310A and the second downlink RF communications signal 310B.

The combining circuit 312 can be provided according to a number of configurations, as discussed next with references to FIGS. 6A-6E. Common elements between FIGS. 3 and 6A-6E are shown therein with common element numbers and will not be re-described herein.

Figure 6A:
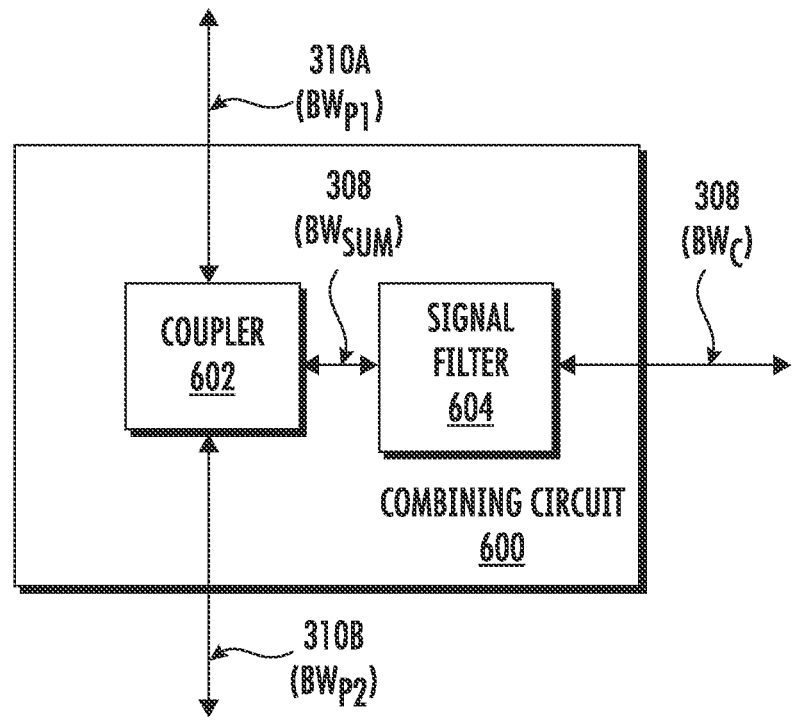
FIGS. 6A-6E are schematic diagrams providing exemplary illustrations of a combining circuit to be provided in the remote unit(s) of FIG. 3 for supporting wide bandwidth DPD.

FIG. 6A is a schematic diagram of an exemplary combining circuit 600, which can be provided in the remote unit 302 in FIG. 3 as the combining circuit 312. The combining circuit 600 includes a coupler 602 and a signal filter 604 that are coupled in series. The coupler 602 is coupled to the first transceiver circuit 306A and the second transceiver circuit 306B in FIG. 3 to receive the first downlink RF communications signal 310A and the second downlink RF communications signal 310B. As mentioned in FIG. 3, the first downlink RF communications signal 310A corresponds to the first processing bandwidth $BW_{P1}$ and the second downlink RF communications signal 310B corresponds to the second processing bandwidth $BW_{P2}$.

The coupler 602 combines the first downlink RF communications signal 310A and the second downlink RF communications signal 310B to generate the downlink RF communications signal 308. As mentioned in the example in FIG. 3, the first downlink RF communications signal 310A corresponds to the first processing bandwidth $BW_{P1}$ ranging from 3350 MHz to 3750 MHz and the second downlink RF communications signal 310B corresponds to the second processing bandwidth $BW_{P2}$ ranging from 3550 MHz to 4150 MHz. As such, the first processing bandwidth $BW_{P1}$ and the second processing bandwidth $BW_{P2}$ overlap between 3550 MHz and 3750 MHz, which is herein referred to as an overlapping bandwidth $BW_O$. Thus, by combining the first downlink RF communications signal 310A and the second downlink RF communications signal 310B, the coupler 602 generates the downlink RF communications signal 308 corresponding to a bandwidth that equals $BW_{P1} + BW_{P2} - BW_O$.

The signal filter 604, which can be any type of bandpass filter as an example, is configured to pass the downlink RF communications signal 308 inside the carrier bandwidth $BW_C$ and block the downlink RF communications signal 308 outside the carrier bandwidth $BW_C$. As a result, the combining circuit 600 can output the downlink RF communications signal 308 in the carrier bandwidth $BW_C$ (e.g., 3550 MHz-3950 MHz).

Figure 6B:
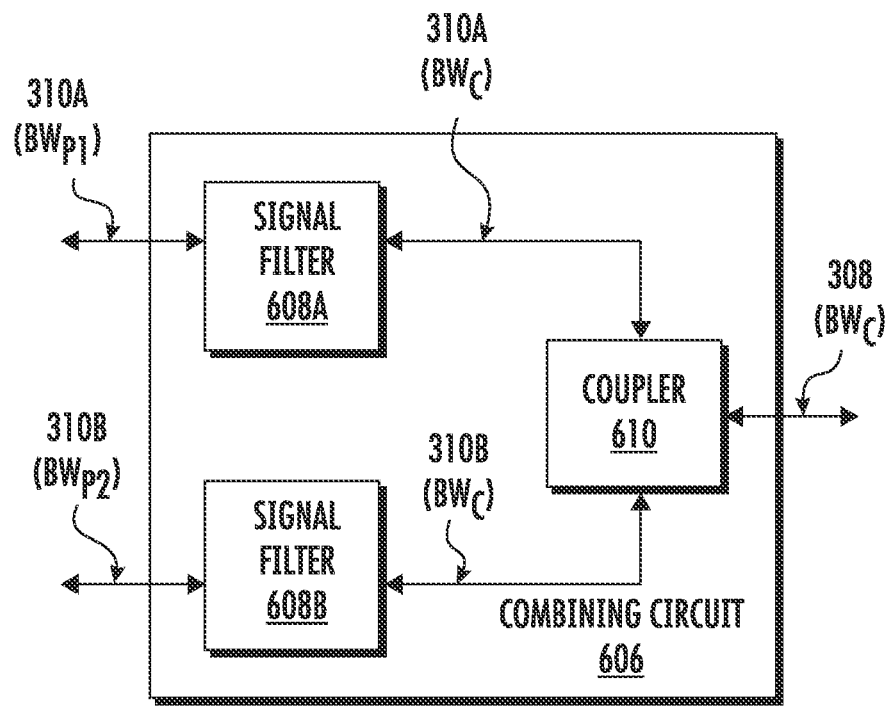

FIG. 6B is a schematic diagram of an exemplary combining circuit 606, which can be provided in the remote unit 302 in FIG. 3 as the combining circuit 312. The combining circuit 606 includes a first signal filter 608A, a second signal filter 608B, and a coupler 610. The first signal filter 608A is coupled to the first transceiver circuit 306A in FIG. 3. The second signal filter 608B is coupled to the second transceiver circuit 306B in FIG. 3. The coupler 610 is coupled to both the first signal filter 608A and the second signal filter 608B.

The first signal filter 608A, which can be any type of bandpass filter as an example, receives the first downlink RF communications signal 310A corresponding to the first processing bandwidth $BW_{P1}$. The first signal filter 608A is configured to pass the first downlink RF communications signal 310A inside the carrier bandwidth $BW_C$ and block the first downlink RF communications signal 310A outside the carrier bandwidth $BW_C$. As a result, the first signal filter 608A outputs the first downlink RF communications signal 310A in the carrier bandwidth $BW_C$.

The second signal filter 608B, which can be any type of bandpass filter as an example, receives the second downlink RF communications signal 310B corresponding to the second processing bandwidth $BW_{P2}$. The second signal filter 608B is configured to pass the second downlink RF communications signal 310B inside the carrier bandwidth $BW_C$ and block the second downlink RF communications signal 310B outside the carrier bandwidth $BW_C$. As a result, the second signal filter 608B outputs the second downlink RF communications signal 310B in the carrier bandwidth $BW_C$.

The coupler 610 combines the first downlink RF communications signal 310A and the second downlink RF communications signal 310B to generate the downlink RF communications signal 308. Given that both the first downlink RF communications signal 310A and the second downlink RF communications signal 310B are inside the carrier bandwidth $BW_C$, the combining circuit 606 can output the downlink RF communications signal 308 in the carrier bandwidth $BW_C$.

Figure 6C:
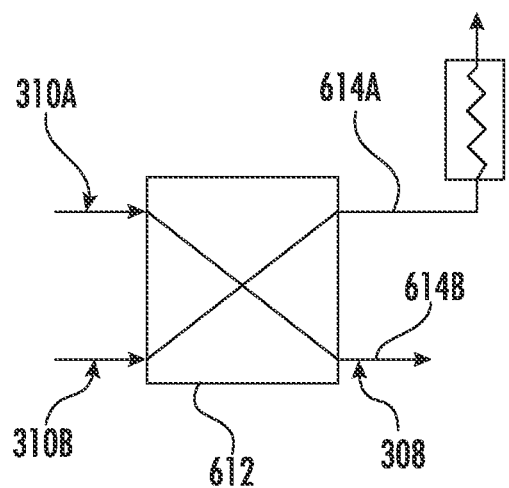

The coupler 602 in FIG. 6A and the coupler 610 in FIG. 6B can each be implemented in a number of ways, as discussed next with reference to FIGS. 6C-6E. FIG. 6C is a schematic diagram of an exemplary three-decibel (3-dB) hybrid coupler 612 configured according to one embodiment of the present disclosure. As shown in FIG. 6C, the 3-dB hybrid coupler 612 receives the first downlink RF communications signal 310A and the second downlink RF communications signal 310B, and outputs the downlink RF communications signal 308 on only one of two output ends 614A and 614B. In a non-limiting example, the output end 614B can be coupled to a single antenna (not shown) for radiating the downlink RF communications signal 308.

Figure 6D:
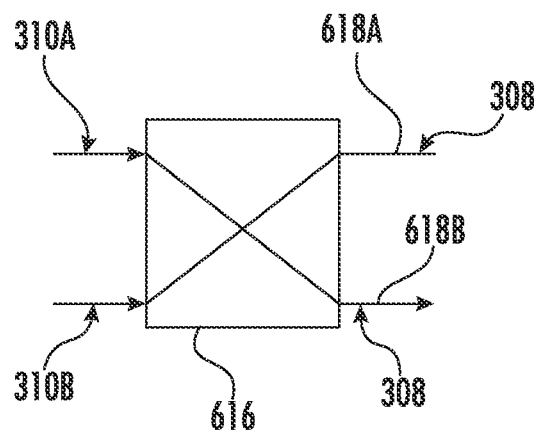

FIG. 6D is a schematic diagram of an exemplary 3-dB hybrid coupler 616 configured according to another embodiment of the present disclosure. As shown in FIG. 6D, the 3-dB hybrid coupler 616 receives the first downlink RF communications signal 310A and the second downlink RF communications signal 310B, and outputs the downlink RF communications signal 308 on two output ends 618A and 618B. In a non-limiting example, the output ends 618A and 618B can be coupled to two single antennas (not shown) for radiating the downlink RF communications signal 308 concurrently.

Figure 6E:
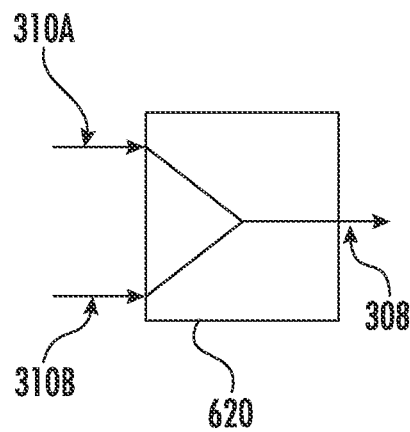

FIG. 6E is a schematic diagram of an exemplary two-way combiner 620 configured according to another embodiment of the present disclosure. As shown in FIG. 6E, the two-way combiner 620 receives the first downlink RF communications signal 310A and the second downlink RF communications signal 310B, and outputs the downlink RF communications signal 308. In a non-limiting example, the two-way combiner 620 can be coupled to a single antenna (not shown) for radiating the downlink RF communications signal 308.

With reference back to FIG. 3, the WCS 300 includes a central unit 316 that is coupled to the remote units 302(1)-302(M) via a number of communications mediums 318(1)-318(M). In a non-limiting example, the central unit 316 is configured to determine the first signal bandwidth $BW_{S1}$ and the second signal bandwidth $BW_{S2}$ based on the carrier bandwidth $BW_C$. Notably, the central unit 316 may determine the first signal bandwidth $BW_{S1}$ and the second signal bandwidth $BW_{S2}$ by taking into consideration the processing bandwidth capabilities of the first transceiver circuit 306A and the second transceiver circuit 306B. Accordingly, the central unit 316 may generate and provide the first downlink digital communications signal 314A and the second downlink digital communications signal 314B to the first transceiver circuit 306A and the second transceiver circuit 306B, respectively.

The first transceiver circuit 306A includes a first digital routing circuit 320A. The first digital routing circuit 320A is configured to receive the first downlink digital communications signal 314A via a first digital interface 322A. In a non-limiting example, the first digital interface 322A is a Common Public Radio Interface (CPRI).

The first transceiver circuit 306A includes a first DPD circuit 324A, a first DAC 326A, a first downlink (DL) filter 328A, a first PA 330A, and a first coupler 332A. The first digital routing circuit 320A is configured to route the first downlink digital communications signal 314A to the first DPD circuit 324A. The first DPD circuit 324A is configured to digitally pre-distort the first downlink digital communications signal 314A based on a first digital feedback signal 334A corresponding to the first processing bandwidth $BW_{P1}$. In this regard, the first DPD circuit 324A needs to be capable of operating in the first processing bandwidth $BW_{P1}$.

The first DAC 326A is configured to covert the first downlink digital communications signal 314A into the first downlink RF communications signal 310A corresponding to the first processing bandwidth $BW_{P1}$. The first DL filter 328A is configured to pass the first downlink RF communications signal 310A inside the first processing bandwidth $BW_{P1}$ and block the first downlink RF communications signal 310A outside the first processing bandwidth $BW_{P1}$. The first power amplifier 330A is configured to amplify the first downlink RF communications signal 310A to a desired power level. In this regard, the first PA 330A also needs to be capable of operating in the first processing bandwidth $BW_{P1}$.

The first coupler 332A is coupled to the first PA 330A and configured to generate a sample of the first downlink RF communications signal 310A corresponding to the first processing bandwidth $BW_{P1}$. The first transceiver circuit 306A also includes a first feedback path 336A coupled between the first coupler 332A and the first DPD circuit 324A. The first feedback path 336A includes a first feedback (FB) filter 338A configured to pass the sample of the first downlink RF communications signal 310A inside the first processing bandwidth $BW_{P1}$ and block the sample of the first downlink RF communications signal 310A outside the first processing bandwidth $BW_{P1}$. The first feedback path 336A also includes a first ADC 340A configured to convert the sample of the first downlink RF communications signal 310A into the first digital feedback signal 334A corresponding to the first processing bandwidth $BW_{P1}$.

The second transceiver circuit 306B includes a second digital routing circuit 320B. The second digital routing circuit 320B is configured to receive the second downlink digital communications signal 314B via a second digital interface 322B. In a non-limiting example, the second digital interface 322B is a CPRI.

The second transceiver circuit 306B includes a second DPD circuit 324B, a second DAC 326B, a second DL filter 328B, a second PA 330B, and a second coupler 332B. The second digital routing circuit 320B is configured to route the second downlink digital communications signal 314B to the second DPD circuit 324B. The second DPD circuit 324B is configured to digitally pre-distort the second downlink digital communications signal 314B based on a second digital feedback signal 334B corresponding to the second processing bandwidth $BW_{P2}$. In this regard, the second DPD circuit 324B needs to be capable of operating in the second processing bandwidth $BW_{P2}$.

The second DAC 326B is configured to covert the second downlink digital communications signal 314B into the second downlink RF communications signal 310B corresponding to the second processing bandwidth $BW_{P2}$. The second DL filter 328B is configured to pass the second downlink RF communications signal 310B inside the second processing bandwidth $BW_{P2}$ and block the second downlink RF communications signal 310B outside the second processing bandwidth $BW_{P2}$. The second PA 330B is configured to amplify the second downlink RF communications signal 310B to a desired power level. In this regard, the second PA 330B also needs to be capable of operating in the second processing bandwidth $BW_{P2}$.

The second coupler 332B is coupled to the second PA 330B and configured to generate a sample of the second downlink RF communications signal 310B corresponding to the second processing bandwidth $BW_{P2}$. The second transceiver circuit 306B also includes a second feedback path 336B coupled between the second coupler 332B and the second DPD circuit 324B. The second feedback path 336B includes a second FB filter 338B configured to pass the sample of the second downlink RF communications signal 310B inside the second processing bandwidth $BW_{P2}$ and block the sample of the second downlink RF communications signal 310B outside the second processing bandwidth $BW_{P2}$. The second feedback path 336B also includes a second ADC 340B configured to convert the sample of the second downlink RF communications signal 310B into the second digital feedback signal 334B corresponding to the second processing bandwidth $BW_{P2}$.

As previously illustrated in FIG. 4C, the first processing bandwidth $BW_{P1}$ overlaps with the second processing bandwidth $BW_{P2}$. In this regard, if the combining circuit 312 provides insufficient isolation between the first transceiver circuit 306A and the second transceiver circuit 306B, the first downlink RF communications signal 310A may be leaked into the second transceiver circuit 306B as an interference signal, which may negatively impact a receiver (not shown) in the second transceiver circuit 306B. Likewise, the second downlink RF communications signal 310B may be leaked into the first transceiver circuit 306A as an interference signal, which may negatively impact a receiver (not shown) in the first transceiver circuit 306A. Since the first processing bandwidth $BW_{P1}$ overlaps with the second processing bandwidth $BW_{P2}$, it is also difficult to employ a filter(s) to block the first downlink RF communications signal 310A from leaking into the second transceiver circuit 306B, and vice versa.

In a non-limiting example, if the required ACPR limit is −45 dBc, then it is desired to have at least −50 dBc ACPR (with a 5 dBc margin) for the remote unit 302. In order to achieve the −50 dBc ACPR, at least a 10 dB Signal to Noise and Distortion (SINAD) ratio may be required. As a result, a −60 dBc SINAD ratio would be required at the first coupler 332A to overcome the interference caused by the leaked second downlink RF communications signal 310B. Similarly, a −60 dBc SINAD ratio would be required at the second coupler 332B to overcome the interference caused by the leaked first downlink RF communications signal 310A.

In this regard, the first transceiver circuit 306A is configured to further include a first isolation circuit 342A coupled between the first coupler 332A and the combining circuit 312. In a non-limiting example, the first isolation circuit 342A includes at least two (e.g., three) first isolators and/or circulators coupled in series between the first coupler 332A and the combining circuit 312. Likewise, the second transceiver circuit 306B is configured to further include a second isolation circuit 342B coupled between the second coupler 332B and the combining circuit 312. In a non-limiting example, the second isolation circuit 342B includes at least two (e.g., three) second isolators and/or circulators coupled in series between the second coupler 332B and the combining circuit 312. In addition to adding the first isolation circuit 342A and the second isolation circuit 342B, it may also be possible to use a hybrid combiner in the combining circuit 312 to further improve isolation of the combining circuit 312.

Figure 6F:
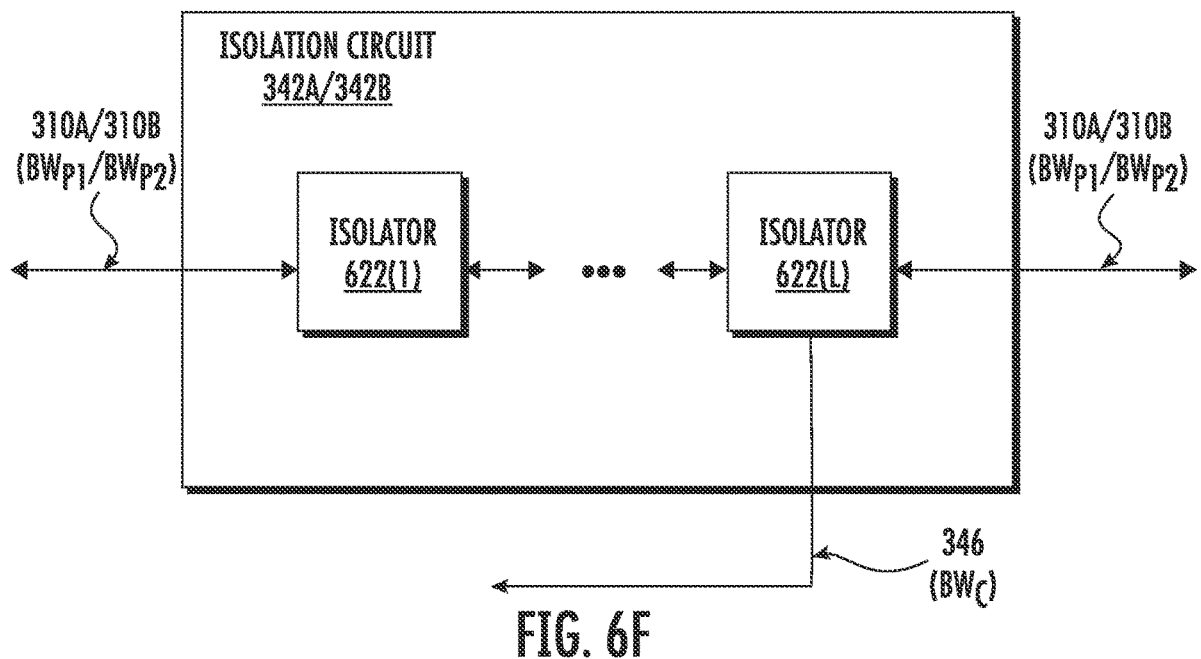
FIG. 6F is a schematic diagram providing an exemplary illustration of an isolation circuit in the WCS of FIG. 3.

FIG. 6F is a schematic diagram providing an exemplary illustration of the first isolation circuit 342A and the first isolation circuit 342B in the WCS 300 of FIG. 3. Common elements between FIGS. 3 and 6F are shown therein with common element numbers and will not be re-described herein. In a non-limiting example, the first isolation circuit 342A and/or the first isolation circuit 342B includes a plurality of isolators 622(1)-622(L) provided in series. Each of the isolators 622(1)-622(L) can be configured to provide a specified level of isolation. In this regard, the first isolation circuit 342A and/or the first isolation circuit 342B can be configured to include a different number of the isolators 622(1)-622(L) based on a specified RF performance requirement(s).

Figure 7:
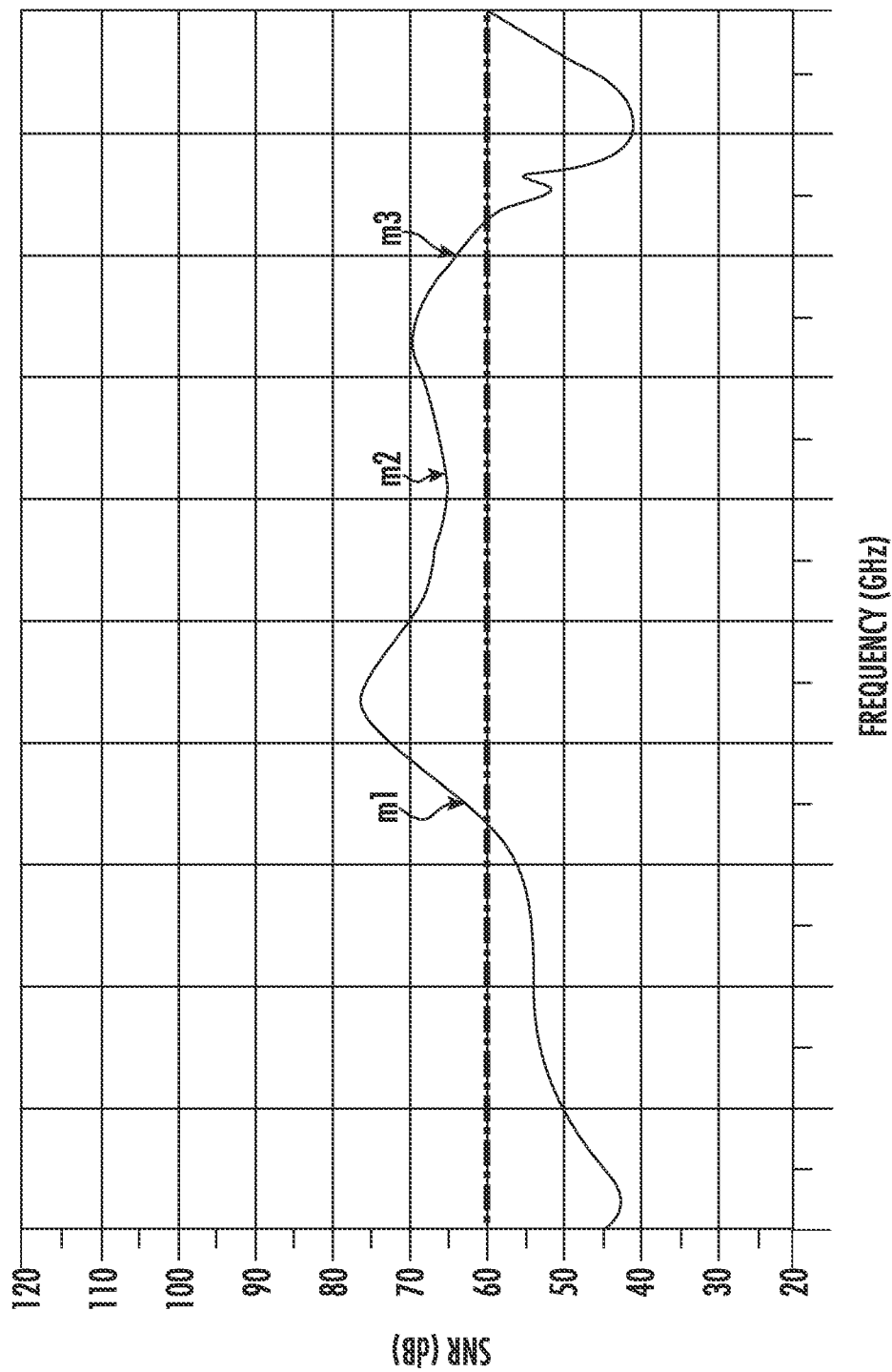
FIG. 7 is a graphic diagram providing an exemplary illustration of a Signal to Noise Ratio (SNR) that can be achieved by the remote unit(s) in FIG. 3.

In this regard, FIG. 7 is a graphic diagram providing an exemplary illustration of the SINAD ratio that can be achieved by the remote unit 302 in FIG. 3. As shown in FIG. 7, the remote unit 302 is capable of achieving above 60 dB SNR across a large bandwidth between m1 and m3.

With reference back to FIG. 3, the first transceiver circuit 306A includes a first uplink path 344A coupled between the first isolation circuit 342A and the first digital routing circuit 320A. The first uplink path 344A is configured to receive an uplink RF communications signal 346 via the combining circuit 312. The first uplink path 344A includes a first uplink (UL) filter 348A configured to pass the uplink RF communications signal 346 inside the carrier bandwidth $BW_C$ and block the uplink RF communications signal 346 outside the carrier bandwidth $BW_C$. The first uplink path 344A also includes a first uplink ADC 350A configured to convert the uplink RF communications signal 346 into an uplink digital communications signal 352.

Similarly, the second transceiver circuit 306B includes a second uplink path 344B coupled between the second isolation circuit 342B and the second digital routing circuit 320B. The second uplink path 344B is configured to receive the uplink RF communications signal 346 via the combining circuit 312. The second uplink path 344B includes a second UL filter 348B configured to pass the uplink RF communications signal 346 inside the carrier bandwidth $BW_C$ and block the uplink RF communications signal 346 outside the carrier bandwidth $BW_C$. The second uplink path 344B also includes a second uplink ADC 350B configured to convert the uplink RF communications signal 346 into the uplink digital communications signal 352.

Notably, each of the first uplink path 344A and the second uplink path 344B can receive the uplink RF communications signal 346 and generate the uplink digital communications signal 352. As such, only one of the first uplink path 344A and the second uplink path 344B need to be activated at any given time. In a non-limiting example, the central unit 316 and/or the remote unit 302 can dynamically deactivate any one of the first uplink path 344A and the second uplink path 344B.

Figure 8:
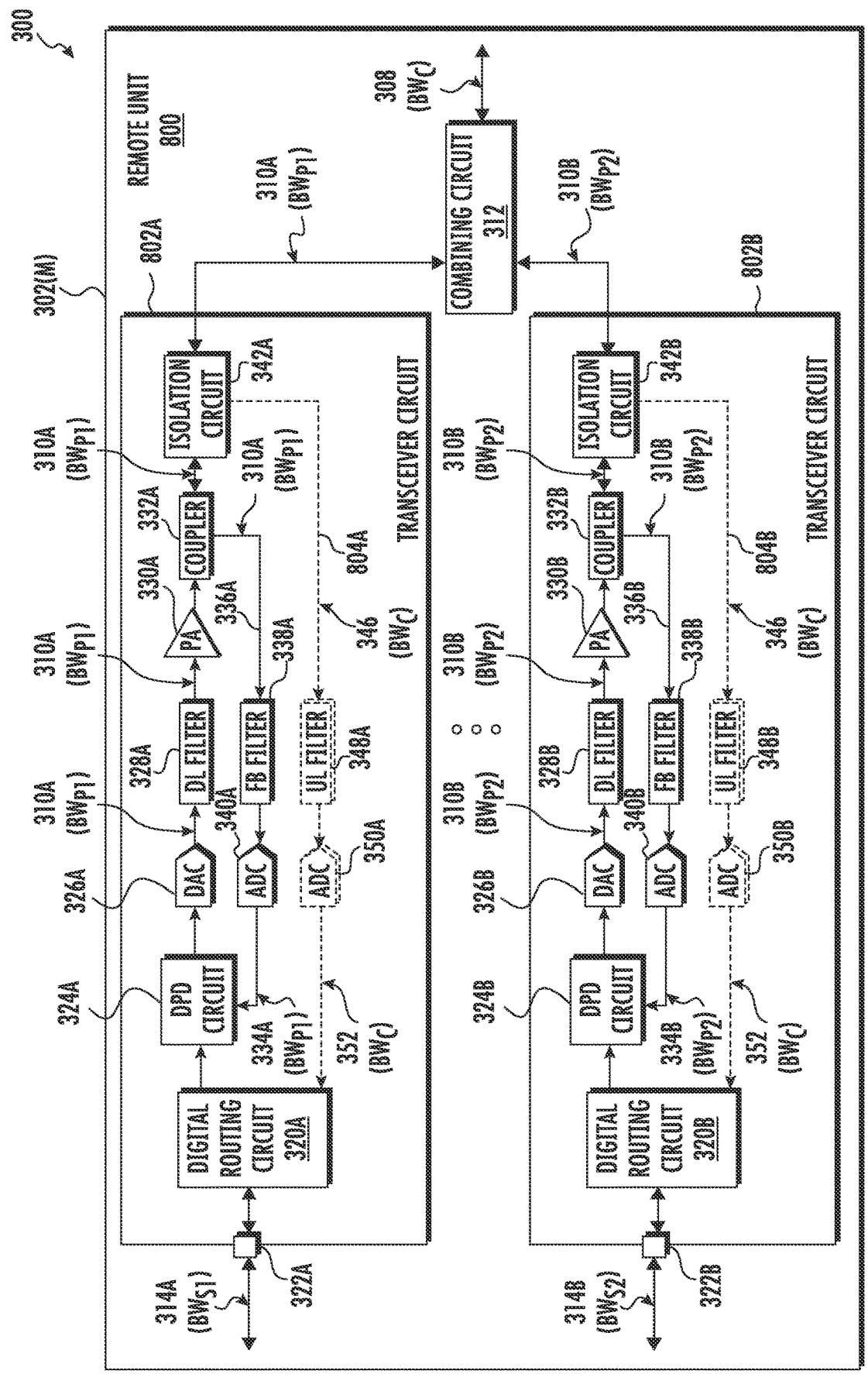
FIG. 8 is a schematic diagram of an exemplary remote unit configured to support wide bandwidth DPD in a Frequency-Division Duplex (FDD) carrier band.

In addition to supporting wide bandwidth DPD for the TDD carrier band, the remote unit 302 can also be configured to support wide bandwidth DPD for a Frequency-Division Duplex (FDD) carrier band. In this regard, FIG. 8 is a schematic diagram of an exemplary remote unit 800 configured to support wide bandwidth DPD in an FDD carrier band. Common elements between FIGS. 3 and 8 are shown therein with common element numbers and will not be re-described herein.

The remote unit 800 includes a first transceiver circuit 802A and a second transceiver circuit 802B. The first transceiver circuit 802A includes a first uplink path 804A. The second transceiver circuit 802B includes a second uplink path 804B. In contrast to the remote unit 302 in FIG. 3, the first uplink path 804A is not coupled to the first isolation circuit 342A. Instead, the first uplink path 804A is coupled to an FDD uplink filter (not shown) to receive the uplink RF communications signal 346. Likewise, the second uplink path 804B is not coupled to the second isolation circuit 342B. Instead, the second uplink path 804B is also coupled to the FDD uplink filter (not shown) to receive the uplink RF communications signal 346. Given that each of the first uplink path 804A and the second uplink path 804B can receive the uplink RF communications signal 346 and generate the uplink digital communications signal 352, only one of the first uplink path 804A and the second uplink path 804B need to be activated at any given time.

Figure 9:
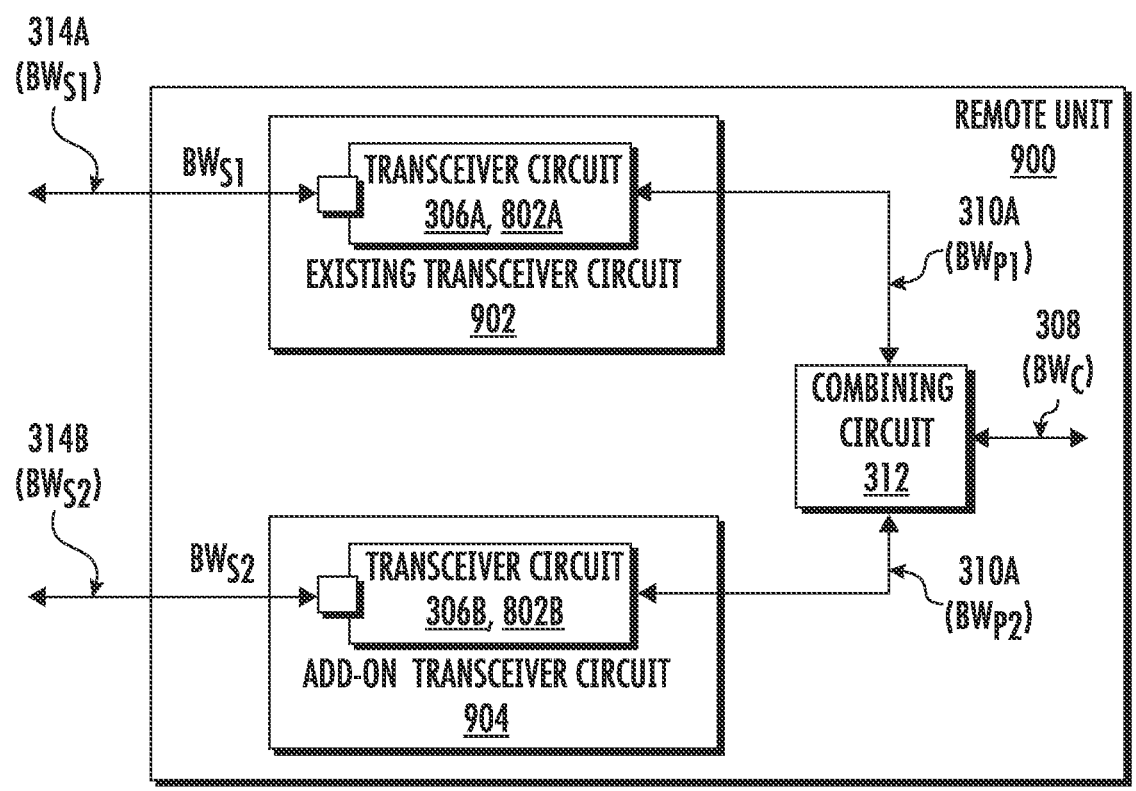
FIG. 9 is a schematic diagram of a remote unit reconfigured to support wide bandwidth DPD by collocating an existing transceiver circuit with an add-on transceiver circuit.

Alternative to building the remote unit 302 or the remote unit 800, it is also possible to modify the existing remote unit 212 in FIG. 2D to support wide bandwidth DPD by retrofitting another transceiver circuit into the existing remote unit 212. In this regard, FIG. 9 is a schematic diagram of a remote unit 900 reconfigured to support wide bandwidth DPD by collocating an existing transceiver circuit 902 with an add-on transceiver circuit 904. Common elements between FIGS. 3, 8, and 9 are shown therein with common element numbers and will not be re-described herein.

In a non-limiting example, the first transceiver circuit 306A or the first transceiver circuit 802A already exist in the existing transceiver circuit 902. According to the previous discussion of FIG. 2D, the existing transceiver circuit 902 alone is incapable of performing wide bandwidth DPD. The add-on transceiver circuit 904, which can include the second transceiver circuit 306B or the second transceiver circuit 802B, are retrofitted into a same chassis as the existing transceiver circuit 902. By adding the add-on transceiver circuit 904, the remote unit 900 becomes capable of supporting wide bandwidth DPD based on the same principle as discussed in FIG. 3. Understandably, each of the existing transceiver circuit 902 and the add-on transceiver circuit 904 can have a respective uplink path (not shown). In this regard, only the uplink path in the add-on transceiver circuit 904 is activated. The uplink path in the existing transceiver circuit 902 will be deactivated.

Figure 10:
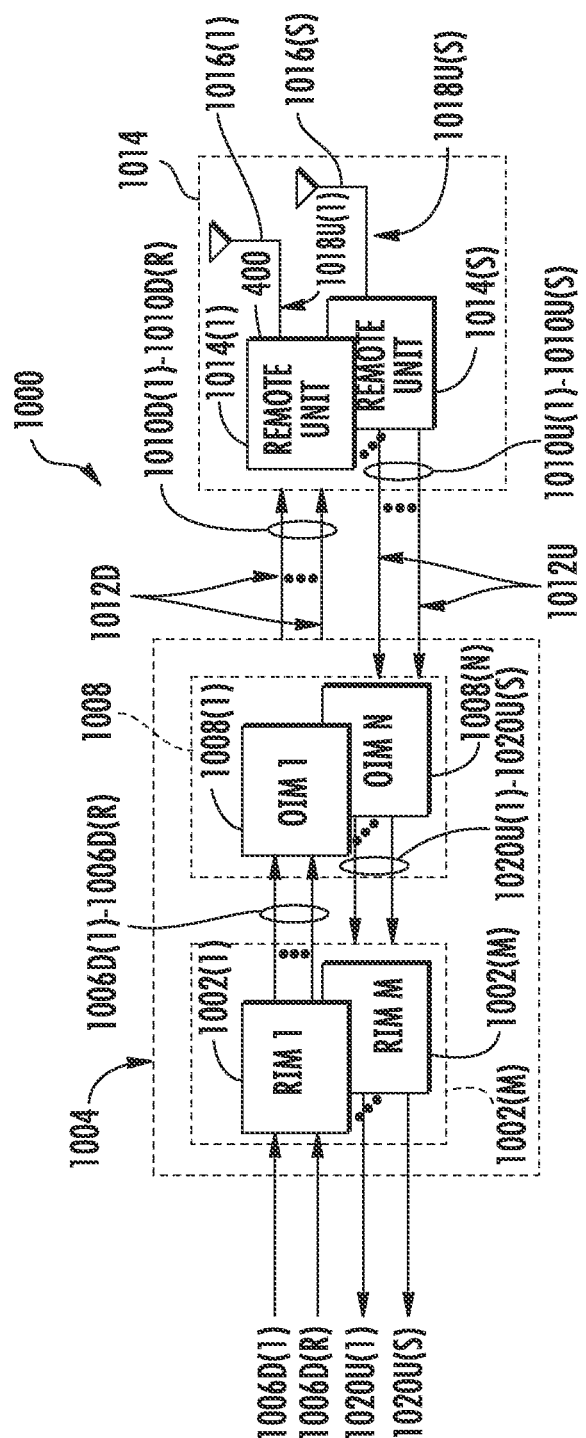
FIG. 10 is a schematic diagram of an exemplary WCS provided in the form of an optical fiber-based distributed antenna system (DAS) that is configured to include the WCS of FIG. 3.

FIG. 10 is a schematic diagram of an exemplary WCS 1000 provided in the form of an optical fiber-based WCS that can include a plurality of remote units, such as the remote unit 302 of FIG. 3 or the remote unit 800 of FIG. 8. The WCS 1000 includes an optical fiber for distributing communications services for multiple frequency bands. The WCS 1000 in this example is comprised of three (3) main components. A plurality of radio interfaces provided in the form of radio interface modules (RIMs) 1002(1)-1002(M) are provided in a central unit 1004 to receive and process a plurality of downlink communications signals 1006D(1)-1006D(R) prior to optical conversion into downlink optical fiber-based communications signals. The downlink communications signals 1006D(1)-1006D(R) may be received from a base station as an example. The RIMs 1002(1)-1002(M) provide both downlink and uplink interfaces for signal processing. The notations "1-R" and "1-M" indicate that any number of the referenced component, 1-R and 1-M, respectively, may be provided. The central unit 1004 is configured to accept the RIMs 1002(1)-1002(M) as modular components that can easily be installed and removed or replaced in the central unit 1004. In one example, the central unit 1004 is configured to support up to twelve (12) RIMS 1002(1)-1002(12). Each of the RIMS 1002(1)-1002(M) can be designed to support a particular type of radio source or range of radio sources (i.e., frequencies) to provide flexibility in configuring the central unit 1004 and the WCS 1000 to support the desired radio sources.

For example, one RIM 1002 may be configured to support the Personalized Communications System (PCS) radio band. Another RIM 1002 may be configured to support the 800 megahertz (MHz) radio band. In this example, by inclusion of the RIMs 1002(1)-1002(M), the central unit 1004 could be configured to support and distribute communications signals on both PCS and Long-Term Evolution (LTE) 700 radio bands, as an example. The RIMs 1002(1)-1002(M)

may be provided in the central unit 1004 that supports any frequency bands desired, including, but not limited to, the US Cellular band, PCS band, Advanced Wireless Service (AWS) band, 700 MHz band, Global System for Mobile Communications (GSM) 900, GSM 1800, and Universal Mobile Telecommunications System (UMTS). The RIMS 1002(1)-1002(M) may also be provided in the central unit 1004 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMS 1002(1)-1002(M) may be provided in the central unit 1004 that supports any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 10, the downlink communications signals 1006D(1)-1006D(R) are provided to a plurality of optical interfaces provided in the form of optical interface modules (OIMs) 1008(1)-1008(N) in this embodiment to convert the downlink communications signals 1006D(1)-1006D(R) into a plurality of downlink optical fiber-based communications signals 1010D(1)-1010D(R). The notation "1-N" indicates that any number of the referenced component 1-N may be provided. The OIMs 1008(1)-1008(N) may be configured to provide a plurality of optical interface components (OICs) that contain optical-to-electrical (O/E) and electrical-to-optical (E/O) converters, as will be described in more detail below. The OIMs 1008(1)-1008(N) support the radio bands that can be provided by the RIMs 1002(1)-1002(M), including the examples previously described above.

The OIMs 1008(1)-1008(N) each include E/O converters to convert the downlink communications signals 1006D(1)-1006D(R) into the downlink optical fiber-based communications signals 1010D(1)-1010D(R). The downlink optical fiber-based communications signals 1010D(1)-1010D(R) are communicated over a downlink optical fiber-based communications medium 1012D to a plurality of remote units 1014(1)-1014(S). At least one selected remote unit among the remote units 1014(1)-1014(S) can be configured to function as the remote unit 302 of FIG. 3 and/or the remote unit 800 of FIG. 8. The notation "1-S" indicates that any number of the referenced component 1-S may be provided. Remote unit O/E converters provided in the remote units 1014(1)-1014(S) convert the downlink optical fiber-based communications signals 1010D(1)-1010D(R) back into the downlink communications signals 1006D(1)-1006D(R), which are then converted into a plurality of downlink RF communications signals and provided to antennas 1016(1)-1016(S) in the remote units 1014(1)-1014(S) to client devices in the reception range of the antennas 1016(1)-1016 (S).

The remote units 1014(1)-1014(S) receive a plurality of uplink RF communications signals from the client devices through the antennas 1016(1)-1016(S). The remote units 1014(1)-1014(S) convert the uplink RF communications signals into a plurality of uplink communications signals 1018U(1)-1018U(S). Remote unit E/O converters are also provided in the remote units 1014(1)-1014(S) to convert the uplink communications signals 1018U(1)-1018U(S) into a plurality of uplink optical fiber-based communications signals 1010U(1)-1010U(S). The remote units 1014(1)-1014(S) communicate the uplink optical fiber-based communications signals 1010U(1)-1010U(S) over an uplink optical fiber-based communications medium 1012U to the OIMs 1008 (1)-1008(N) in the central unit 1004. The OIMs 1008(1)-1008(N) include O/E converters that convert the received uplink optical fiber-based communications signals 1010U (1)-1010U(S) into a plurality of uplink communications signals 1020U(1)-1020U(S), which are processed by the RIMs 1002(1)-1002(M) and provided as the uplink communications signals 1020U(1)-1020U(S). The central unit 1004 may provide the uplink communications signals 1020U(1)-1020U(S) to a base station or other communications system.

Note that the downlink optical fiber-based communications medium 1012D and the uplink optical fiber-based communications medium 1012U connected to each of the remote units 1014(1)-1014(S) may be a common optical fiber-based communications medium, wherein for example, wave division multiplexing (WDM) is employed to provide the downlink optical fiber-based communications signals 1010D(1)-1010D(R) and the uplink optical fiber-based communications signals 1010U(1)-1010U(S) on the same optical fiber-based communications medium.

Figure 11:
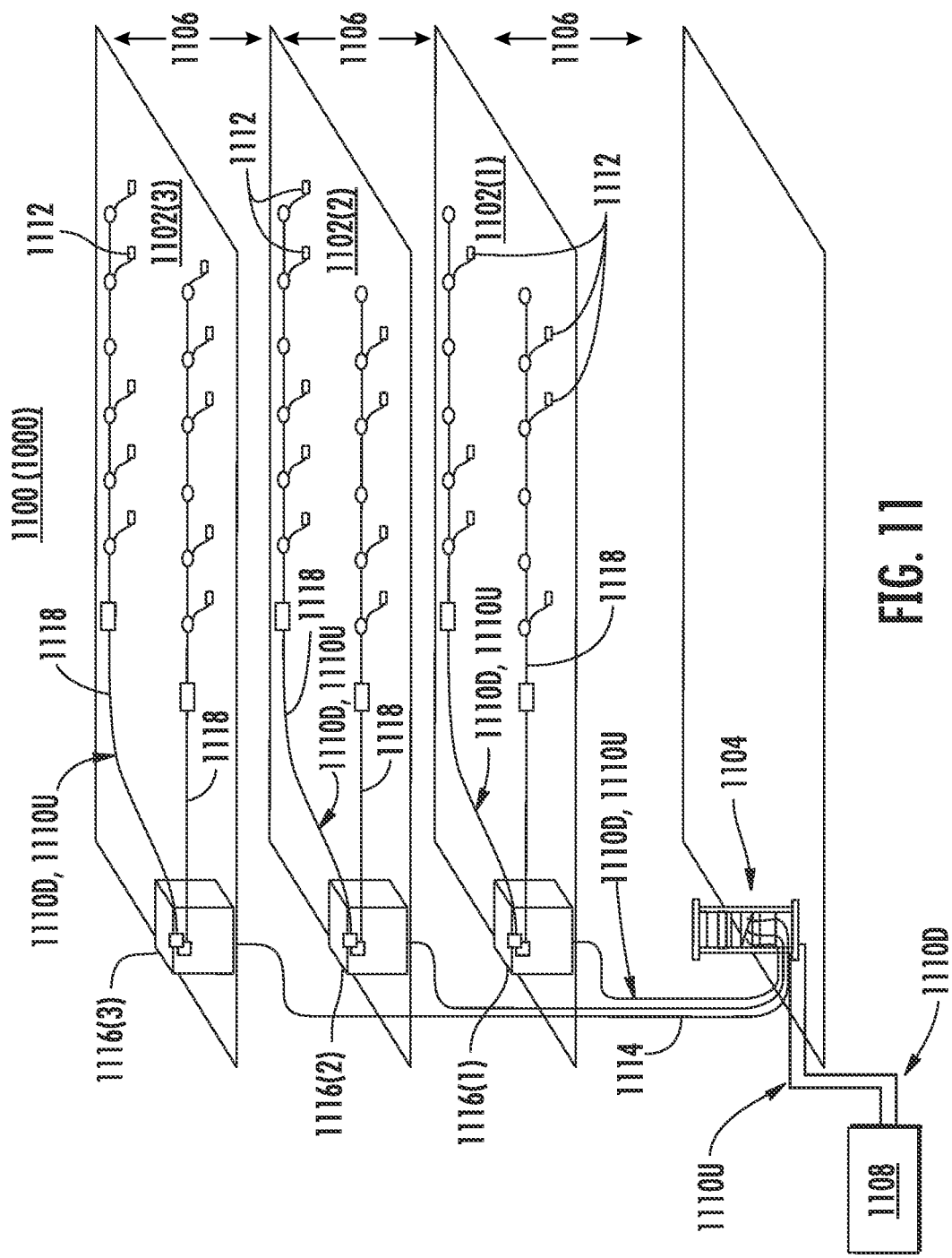
FIG. 11 is a schematic diagram of an exemplary building infrastructure with a deployed DCS, such as the optical fiber-based DAS in FIG. 10.

The WCS 1000 in FIG. 10 can be provided in an indoor environment as illustrated in FIG. 11. FIG. 11 is a partial schematic cut-away diagram of an exemplary building infrastructure 1100 in a WCS, such as the WCS 1000 of FIG. 10. The building infrastructure 1100 in this embodiment includes a first (ground) floor 1102(1), a second floor 1102 (2), and a third floor 1102(3). The floors 1102(1)-1102(3) are serviced by a central unit 1104 to provide antenna coverage areas 1106 in the building infrastructure 1100. The central unit 1104 is communicatively coupled to a base station 1108 to receive downlink communications signals 1110D from the base station 1108. The central unit 1104 is communicatively coupled to a plurality of remote units 1112 to distribute the downlink communications signals 1110D to the remote units 1112 and to receive uplink communications signals 1110U from the remote units 1112, as previously discussed above. The downlink communications signals 1110D and the uplink communications signals 1110U communicated between the central unit 1104 and the remote units 1112 are carried over a riser cable 1114. The riser cable 1114 may be routed through interconnect units (ICUs) 1116(1)-1116(3) dedicated to each of the floors 1102(1)-1102(3) that route the downlink communications signals 1110D and the uplink communications signals 1110U to the remote units 1112 and also provide power to the remote units 1112 via array cables 1118.

Figure 12:
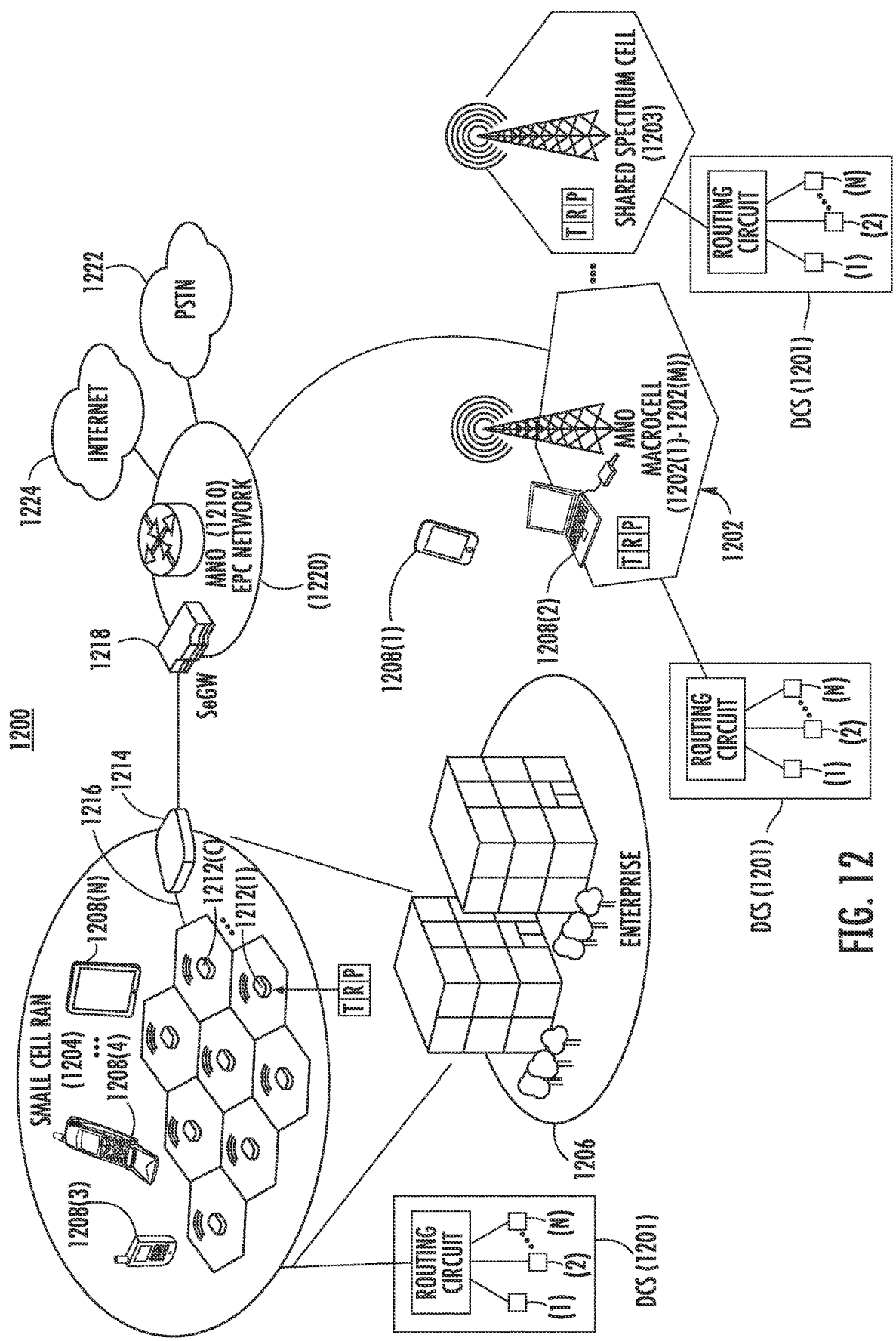
FIG. 12 is a schematic diagram of an exemplary mobile telecommunications environment that includes an exemplary radio access network (RAN) that includes a mobile network operator (MNO) macrocell employing a radio node, a shared spectrum cell employing a radio node, an exemplary small cell RAN employing a multi-operator radio node located within an enterprise environment, wherein any of the radio nodes can employ or be coupled to a shared spectrum DCS configured to selectively route channels of shared spectrum downlink communications signals of multiple service providers to remote units based on shared spectrum input information used to determine spectrum usage coordination between the remote units, including but not limited to the WCS of FIG. 10.

The WCS 1000 of FIG. 10, which includes the remote unit 302 of FIG. 3 and/or the remote unit 800 of FIG. 8 configured to support wide bandwidth DPD can also be interfaced with different types of radio nodes of service providers and/or supporting service providers, including macrocell systems, small cell systems, and remote radio heads (RRH) systems, as examples. For example, FIG. 12 is a schematic diagram of an exemplary mobile telecommunications environment 1200 (also referred to as "environment 1200") that includes radio nodes and cells that may support shared spectrum, such as unlicensed spectrum, and can be interfaced to shared spectrum DCSs 1201 supporting coordination of distribution of shared spectrum from multiple service providers to remote units to be distributed to subscriber devices. The shared spectrum DCSs 1201 can include the WCS 1000 of FIG. 10 as an example.

The environment 1200 includes exemplary macrocell RANs 1202(1)-1202(M) ("macrocells 1202(1)-1202(M)") and an exemplary small cell RAN 1204 located within an enterprise environment 1206 and configured to service mobile communications between a user mobile communications device 1208(1)-1208(N) to a mobile network operator (MNO) 1210. A serving RAN for the user mobile communications devices 1208(1)-1208(N) is a RAN or cell in the RAN in which the user mobile communications devices 1208(1)-1208(N) have an established communications session with the exchange of mobile communications signals for mobile communications. Thus, a serving RAN may also be referred to herein as a serving cell. For example, the user mobile communications devices 1208(3)-1208(N) in FIG. 12 are being serviced by the small cell RAN 1204, whereas the user mobile communications devices 1208(1) and 1208(2) are being serviced by the macrocell 1202. The macrocell 1202 is an MNO macrocell in this example. However, a shared spectrum RAN 1203 (also referred to as "shared spectrum cell 1203") includes a macrocell in this example and supports communications on frequencies that are not solely licensed to a particular MNO, such as CBRS for example, and thus may service user mobile communications devices 1208(1)-1208(N) independent of a particular MNO. For example, the shared spectrum cell 1203 may be operated by a third party that is not an MNO and wherein the shared spectrum cell 1203 supports CBRS. Also, as shown in FIG. 12, the MNO macrocell 1202, the shared spectrum cell 1203, and/or the small cell RAN 1204 can interface with a shared spectrum DCS 1201 supporting coordination of distribution of shared spectrum from multiple service providers to remote units to be distributed to subscriber devices. The MNO macrocell 1202, the shared spectrum cell 1203, and the small cell RAN 1204 may be neighboring radio access systems to each other, meaning that some or all can be in proximity to each other such that a user mobile communications device 1208(3)-1208(N) may be able to be in communications range of two or more of the MNO macrocell 1202, the shared spectrum cell 1203, and the small cell RAN 1204 depending on the location of the user mobile communications devices 1208(3)-1208(N).

In FIG. 12, the mobile telecommunications environment 1200 in this example is arranged as an LTE system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 1200 includes the enterprise environment 1206 in which the small cell RAN 1204 is implemented. The small cell RAN 1204 includes a plurality of small cell radio nodes 1212(1)-1212(C). Each small cell radio node 1212(1)-1212(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 12, the small cell RAN 1204 includes one or more services nodes (represented as a single services node 1214) that manage and control the small cell radio nodes 1212(1)-1212(C). In alternative implementations, the management and control functionality may be incorporated into a radio node, distributed among nodes, or implemented remotely (i.e., using infrastructure external to the small cell RAN 1204). The small cell radio nodes 1212(1)-1212(C) are coupled to the services node 1214 over a direct or local area network (LAN) connection 1216 as an example, typically using secure IPsec tunnels. The small cell radio nodes 1212(1)-1212(C) can include multi-operator radio nodes. The services node 1214 aggregates voice and data traffic from the small cell radio nodes 1212(1)-1212(C) and provides connectivity over an IPsec tunnel to a security gateway (SeGW) 1218 in a network 1220 (e.g, evolved packet core (EPC) network in a 4G network, or 5G Core in a 5G network) of the MNO 1210. The network 1220 is typically configured to communicate with a public switched telephone network (PSTN) 1222 to carry circuit-switched traffic, as well as for communicating with an external packet-switched network such as the Internet 1224.

The environment 1200 also generally includes a node (e.g., eNodeB or gNodeB) base station, or "macrocell" 1202. The radio coverage area of the macrocell 1202 is typically much larger than that of a small cell where the extent of coverage often depends on the base station configuration and surrounding geography. Thus, a given user mobile communications device 1208(3)-1208(N) may achieve connectivity to the network 1220 (e.g., EPC network in a 4G network, or 5G Core in a 5G network) through either a macrocell 1202 or small cell radio node 1212(1)-1212(C) in the small cell RAN 1204 in the environment 1200.

Figure 13:
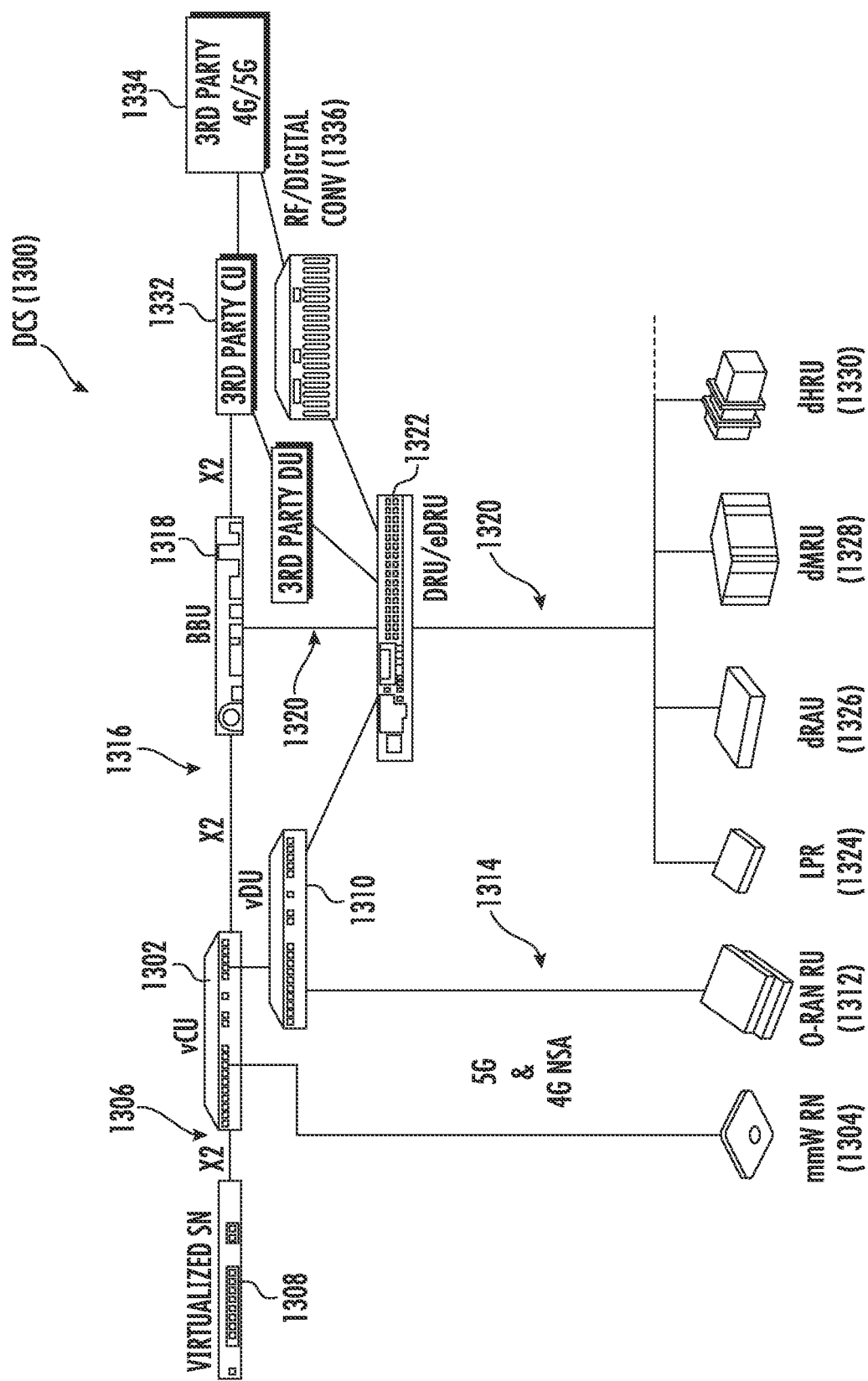
FIG. 13 is a schematic diagram of an exemplary distributed communications system that supports fourth-generation (4G) and fifth-generation (5G) communications services, and wherein any of the radio nodes can be configured to perform RF-based ranging and imaging in the wireless communications cell.

FIG. 13 is a schematic diagram of another exemplary DCS 1300 that supports 4G and 5G communications services, and wherein any of the radio nodes can be configured to provide feedbackless interference estimation and suppression, according to any of the embodiments herein. The DCS 1300 supports both legacy 4G LTE, 4G/5G non-standalone (NSA), and 5G communications systems. As shown in FIG. 13, a centralized services node 1302, such as the central unit 316 in FIG. 3, is provided that is configured to interface with a core network to exchange communications data and distribute the communications data as radio signals to remote units. In this example, the centralized services node 1302 is configured to support distributed communications services to a millimeter wave (mmW) radio node 1304. The functions of the centralized services node 1302 can be virtualized through an x2 interface 1306 to another services node 1308. The centralized services node 1302 can also include one or more internal radio nodes that are configured to be interfaced with a distribution node 1310 to distribute communications signals for the radio nodes to an open RAN (O-RAN) remote unit 1312 that is configured to be communicatively coupled through an O-RAN interface 1314.

The centralized services node 1302 can also be interfaced through an x2 interface 1316 to a baseband unit (BBU) 1318 that can provide a digital signal source to the centralized services node 1302. The BBU 1318 is configured to provide a signal source to the centralized services node 1302 to provide radio source signals 1320 to the O-RAN remote unit 1312 as well as to a distributed router unit (DRU) 1322 as part of a digital DAS. The DRU 1322 is configured to split and distribute the radio source signals 1320 to different types of remote units, including a lower power remote unit (LPR) 1324, a radio antenna unit (dRAU) 1326, a mid-power remote unit (dMRU) 1328, and a high power remote unit (dHRU) 1330. The BBU 1318 is also configured to interface with a third party central unit 1332 and/or an analog source 1334 through an RF/digital converter 1336.

Figure 14:
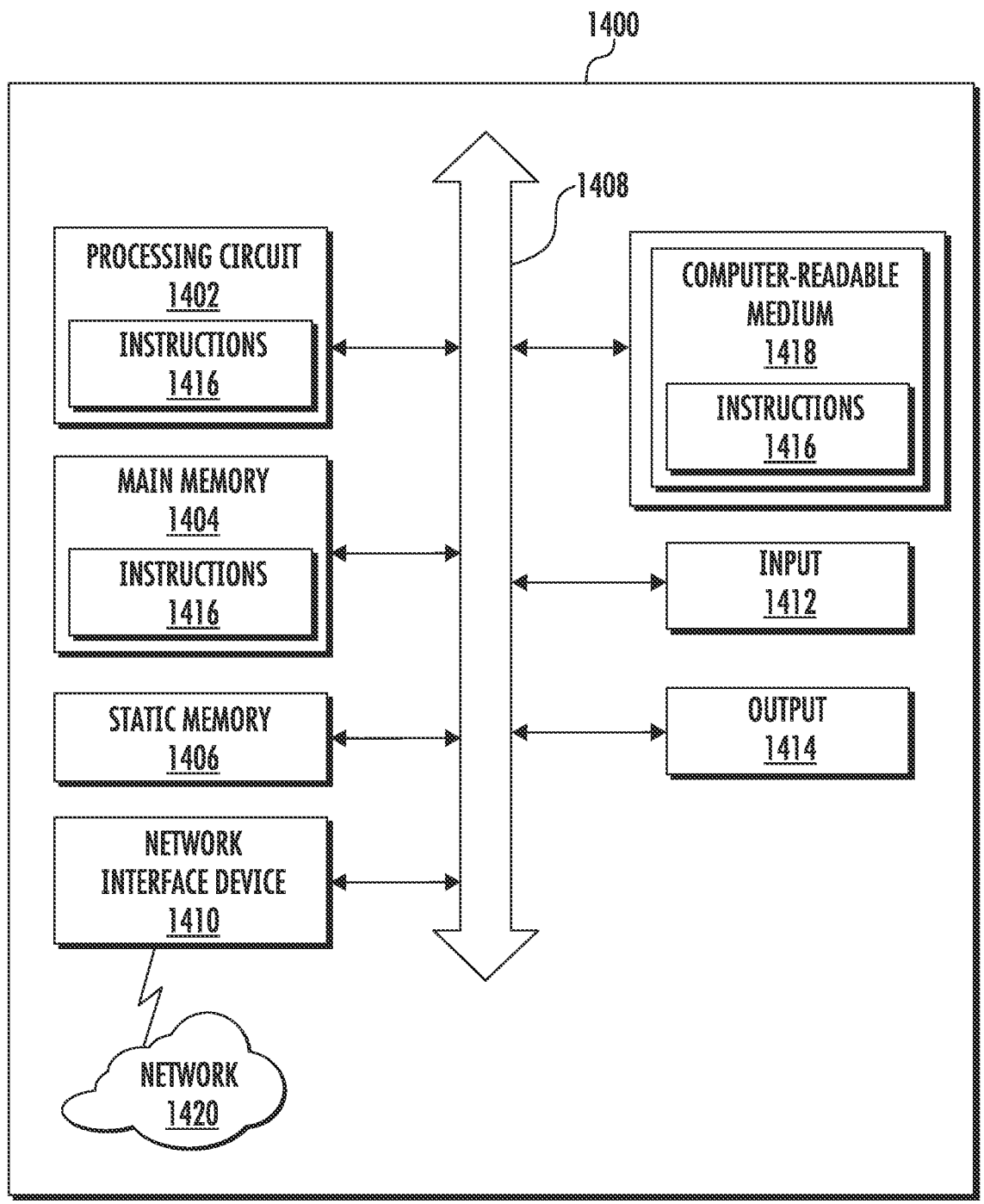
FIG. 14 is a schematic diagram of a representation of an exemplary computer system that can be included in or interfaced with any of the components in the remote unit of FIGS. 3 and 8, wherein the exemplary computer system is configured to execute instructions from an exemplary computer-readable medium.

Any of the circuits in the remote unit 302 of FIG. 3 and the remote unit 800 of FIG. 8 can include a computer system 1400, such as that shown in FIG. 14, to carry out their functions and operations. With reference to FIG. 14, the computer system 1400 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1400 in this embodiment includes a processing circuit or processor 1402, a main memory 1404 (e.g., read-only memory (ROM), flash memory, dynamic random access memory (DRAM) such as synchronous DRAM (SDRAM), etc.), and a static memory 1406 (e.g., flash memory, static random access memory (SRAM), etc.), which may communicate with each other via a data bus 1408. Alternatively, the processing circuit 1402 may be connected to the main memory 1404 and/or static memory 1406 directly or via some other connectivity means. The processing circuit 1402 may be a controller, and the main memory 1404 or static memory 1406 may be any type of memory.

The processing circuit 1402 represents one or more general-purpose processing circuits such as a microprocessor, central processing unit, or the like. More particularly, the processing circuit 1402 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1402 is configured to execute processing logic in instructions 1416 for performing the operations and steps discussed herein.

The computer system 1400 may further include a network interface device 1410. The computer system 1400 also may or may not include an input 1412 to receive input and selections to be communicated to the computer system 1400 when executing instructions. The computer system 1400 also may or may not include an output 1414, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1400 may or may not include a data storage device that includes instructions 1416 stored in a computer-readable medium 1418. The instructions 1416 may also reside, completely or at least partially, within the main memory 1404 and/or within the processing circuit 1402 during execution thereof by the computer system 1400, the main memory 1404 and the processing circuit 1402 also constituting the computer-readable medium 1418. The instructions 1416 may further be transmitted or received over a network 1420 via the network interface device 1410.

While the computer-readable medium 1418 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A method for supporting wide bandwidth digital predistortion (DPD) in a wireless communications system (WCS), comprising:
    in a first transceiver circuit:
        receiving a first downlink digital communications signal corresponding to a first signal bandwidth; and
        converting the first downlink digital communications signal into a first downlink radio frequency (RF) communications signal corresponding to a first processing bandwidth that is at least three times the first signal bandwidth;
    in a second transceiver circuit:
        receiving a second downlink digital communications signal corresponding to a second signal bandwidth; and
        converting the second downlink digital communications signal into a second downlink RF communications signal corresponding to a second processing bandwidth that is at least three times the second signal bandwidth;
    outputting at least one downlink RF communications signal comprising the first downlink RF communications signal and the second downlink RF communications signal and corresponding to a carrier bandwidth, wherein the carrier bandwidth is greater than or equal to a sum of the first signal bandwidth and the second signal bandwidth and narrower than a sum of the first processing bandwidth and the second processing bandwidth; and
    converting the first downlink digital communications signal corresponding to the first signal bandwidth into the first downlink RF communications signal corresponding to the first processing bandwidth.

2. The method of claim 1, further comprising passing the first downlink RF communications signal inside the first processing bandwidth and blocking the first downlink RF communications signal outside the first processing bandwidth.

3. The method of claim 2, further comprising providing the first downlink digital communications signal and the second downlink digital communications signal from a central unit to the first transceiver circuit and the second transceiver circuit, respectively.

4. The method of claim 1, further comprising combining the first downlink RF communications signal and the second downlink RF communications signal to generate the at least one downlink RF communications signal.

5. The method of claim 4, further comprising passing the at least one downlink RF communications signal inside the carrier bandwidth and blocking the at least one downlink RF communications signal outside the carrier bandwidth.

6. The method of claim 4, further comprising:
    passing the first downlink RF communications signal inside the carrier bandwidth and blocking the first downlink RF communications signal outside the carrier bandwidth; and
    passing the second downlink RF communications signal inside the carrier bandwidth and blocking the second downlink RF communications signal outside the carrier bandwidth.

7. The method of claim 1, further comprising, in one of the first transceiver circuit and the second transceiver circuit, receiving an uplink RF communications signal and converting the uplink RF communications signal into an uplink digital communications signal.

8. A method for supporting wide bandwidth digital predistortion (DPD) in a wireless communications system (WCS), comprising:
    receiving a first downlink digital communications signal corresponding to a first signal bandwidth;
    converting the first downlink digital communications signal into a first downlink radio frequency (RF) communications signal corresponding to a first processing bandwidth that is at least three times the first signal bandwidth;
    receiving a second downlink digital communications signal corresponding to a second signal bandwidth;
    converting the second downlink digital communications signal into a second downlink RF communications signal corresponding to a second processing bandwidth that is at least three times the second signal bandwidth;
    outputting, via a combining circuit, at least one downlink RF communications signal comprising the first downlink RF communications signal and the second downlink RF communications signal and corresponding to a carrier bandwidth, wherein the carrier bandwidth is greater than or equal to a sum of the first signal bandwidth and the second signal bandwidth and narrower than a sum of the first processing bandwidth and the second processing bandwidth;
    converting the first downlink digital communications signal corresponding to the first signal bandwidth into the first downlink RF communications signal corresponding to the first processing bandwidth;
    passing the first downlink RF communications signal inside the first processing bandwidth and blocking the first downlink RF communications signal outside the first processing bandwidth; and
    amplifying the first downlink RF communications signal.

9. The method of claim 8, further comprising:
converting the second downlink digital communications signal corresponding to the second signal bandwidth into the second downlink RF communications signal corresponding to the second processing bandwidth;
passing the second downlink RF communications signal inside the second processing bandwidth and blocking the second downlink RF communications signal outside the second processing bandwidth; and
amplifying the second downlink RF communications signal.

10. The method of claim 9, further comprising:
receiving the first downlink digital communications signal via a first digital interface that is a common public radio interface (CPRI); and
receiving the second downlink digital communications signal via a second digital interface that is the CPRI.

11. The method of claim 8, further comprising combining the first downlink RF communications signal and the second downlink RF communications signal to generate the at least one downlink RF communications signal.

12. The method of claim 11, further comprising passing the at least one downlink RF communications signal inside the carrier bandwidth and blocking the at least one downlink RF communications signal outside the carrier bandwidth.

13. A method for supporting wide bandwidth digital pre-distortion (DPD) in a wireless communications system (WCS), comprising:
in a first transceiver circuit, converting a first downlink digital communications signal corresponding to a first signal bandwidth into a first downlink radio frequency (RF) communications signal corresponding to a first processing bandwidth that is at least three times the first signal bandwidth;
in a second transceiver circuit, converting a second downlink digital communications signal corresponding to a second signal bandwidth into a second downlink RF communications signal corresponding to a second processing bandwidth that is at least three times the second signal bandwidth;
outputting, via a combining circuit, at least one downlink RF communications signal comprising the first downlink RF communications signal and the second downlink RF communications signal and corresponding to a carrier bandwidth, wherein the carrier bandwidth is greater than or equal to a sum of the first signal bandwidth and the second signal bandwidth and narrower than a sum of the first processing bandwidth and the second processing bandwidth; and
providing the first downlink digital communications signal and the second downlink digital communications signal from a central unit to the first transceiver circuit and the second transceiver circuit, respectively.

14. The method of claim 13, further comprising, in the first transceiver circuit:
converting the first downlink digital communications signal corresponding to the first signal bandwidth into the first downlink RF communications signal corresponding to the first processing bandwidth; and
passing the first downlink RF communications signal inside the first processing bandwidth and blocking the first downlink RF communications signal outside the first processing bandwidth.

15. The method of claim 14, further comprising amplifying the first downlink RF communications signal.

16. The method of claim 15, further comprising, in the second transceiver circuit, converting the second downlink digital communications signal corresponding to the second signal bandwidth into the second downlink RF communications signal corresponding to the second processing bandwidth.

17. The method of claim 16, further comprising, in the second transceiver circuit:
passing the second downlink RF communications signal inside the second processing bandwidth and blocking the second downlink RF communications signal outside the second processing bandwidth; and
amplifying the second downlink RF communications signal.

18. The method of claim 13, further comprising combining the first downlink RF communications signal and the second downlink RF communications signal to generate the at least one downlink RF communications signal.

19. The method of claim 18, further comprising passing the at least one downlink RF communications signal inside the carrier bandwidth and blocking the at least one downlink RF communications signal outside the carrier bandwidth.

\* \* \* \* \*